United States Patent [19]
Pryor

[11] Patent Number: 5,506,682
[45] Date of Patent: *Apr. 9, 1996

[54] ROBOT VISION USING TARGETS

[75] Inventor: Timothy R. Pryor, Windsor, Canada

[73] Assignee: Sensor Adaptive Machines Inc., Windsor, Canada

[*] Notice: The term of this patent shall not extend beyond the expiration date of Pat. No. 4,654,949.

[21] Appl. No.: 664,574

[22] Filed: Mar. 6, 1991

Related U.S. Application Data

[63] Continuation of Ser. No. 393,119, Aug. 10, 1989, abandoned, which is a continuation of Ser. No. 96,640, Sep. 11, 1987, abandoned, which is a division of Ser. No. 933,256, Nov. 20, 1986, abandoned, which is a continuation of Ser. No. 660,042, Oct. 12, 1984, abandoned, which is a continuation-in-part of Ser. No. 348,803, Feb. 16, 1982, abandoned.

[51] Int. Cl.⁶ .................................................. B23Q 17/00
[52] U.S. Cl. ........................................... 356/375; 356/400
[58] Field of Search .................................... 356/375, 400; 250/203.2, 203.3; 901/47

[56] References Cited

U.S. PATENT DOCUMENTS 3,888,362  6/1975  Fletcher et al. ............................ 901/47
4,219,847  8/1980  Pinkney et al. ............................ 901/47
4,295,740  10/1981  Sturges .................................. 250/203.3
4,396,945  8/1983  DiMatteo et al. ....................... 356/375
4,654,949  4/1987  Pryor ........................................ 29/407

OTHER PUBLICATIONS

Ayoub, E. E. "Learning Hardware–Software System for the Recognition and Pick Up of Objects" *IBM Technical Disclosure Bulletin*, vol. 17, No. 7 Dec. 1974 pp. 2144–2148.

Primary Examiner—Richard A. Rosenberger
Attorney, Agent, or Firm—Larson and Taylor

[57] ABSTRACT

Method and apparatus are disclosed for determining the position and attitude of objects, together with robotic systems employing same, and methods of targeting objects for such purposes. Particularly of interest is the application to continuous conveyors, particularly in the process of automobile manufacture. Also disclosed is the use of naturally occuring object features as targets in a machine vision based robot (or other) guidance system. In one embodiment, a special high speed processor finds at least 3 preselected feature points on an object, which when considered with the data base for the object, allows a rapid 6 degree of freedom solution for the object location relative to the camera and thence connected automation. While primarily envisioned for industrial robots, the invention is useful for all sorts of machines including vehicles, construction machinery and the like—anywhere the target object has a known data base relative to the features in question.

9 Claims, 12 Drawing Sheets

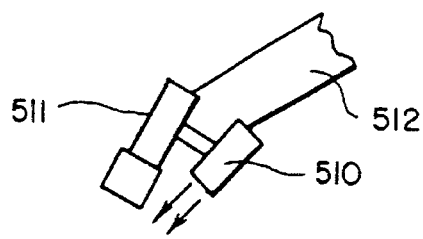
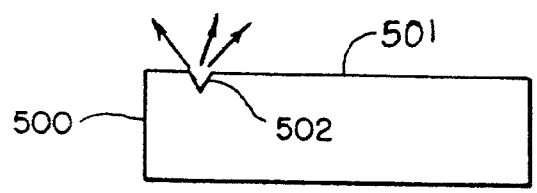
FIG. 7A
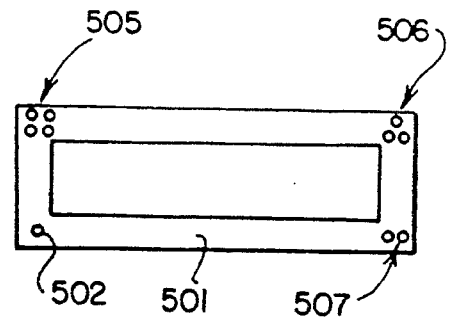
FIG. 7B
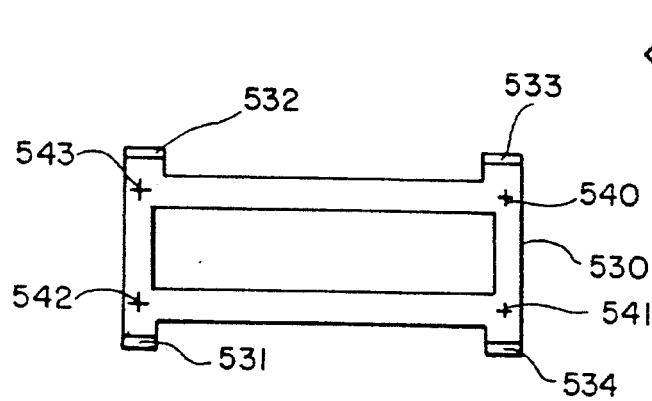
FIG. 8A
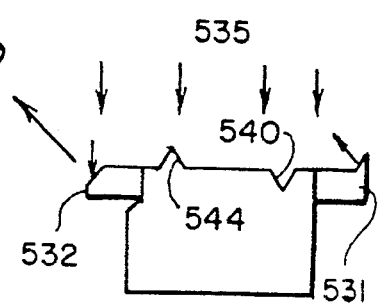
FIG. 8C
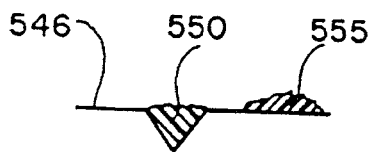
FIG. 8B
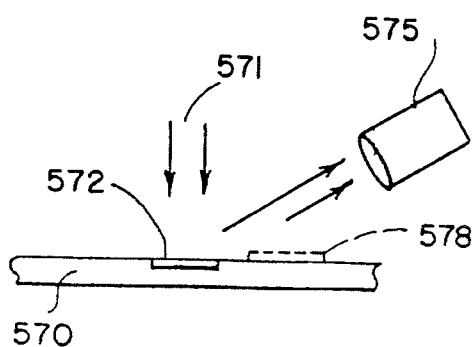
FIG. 9

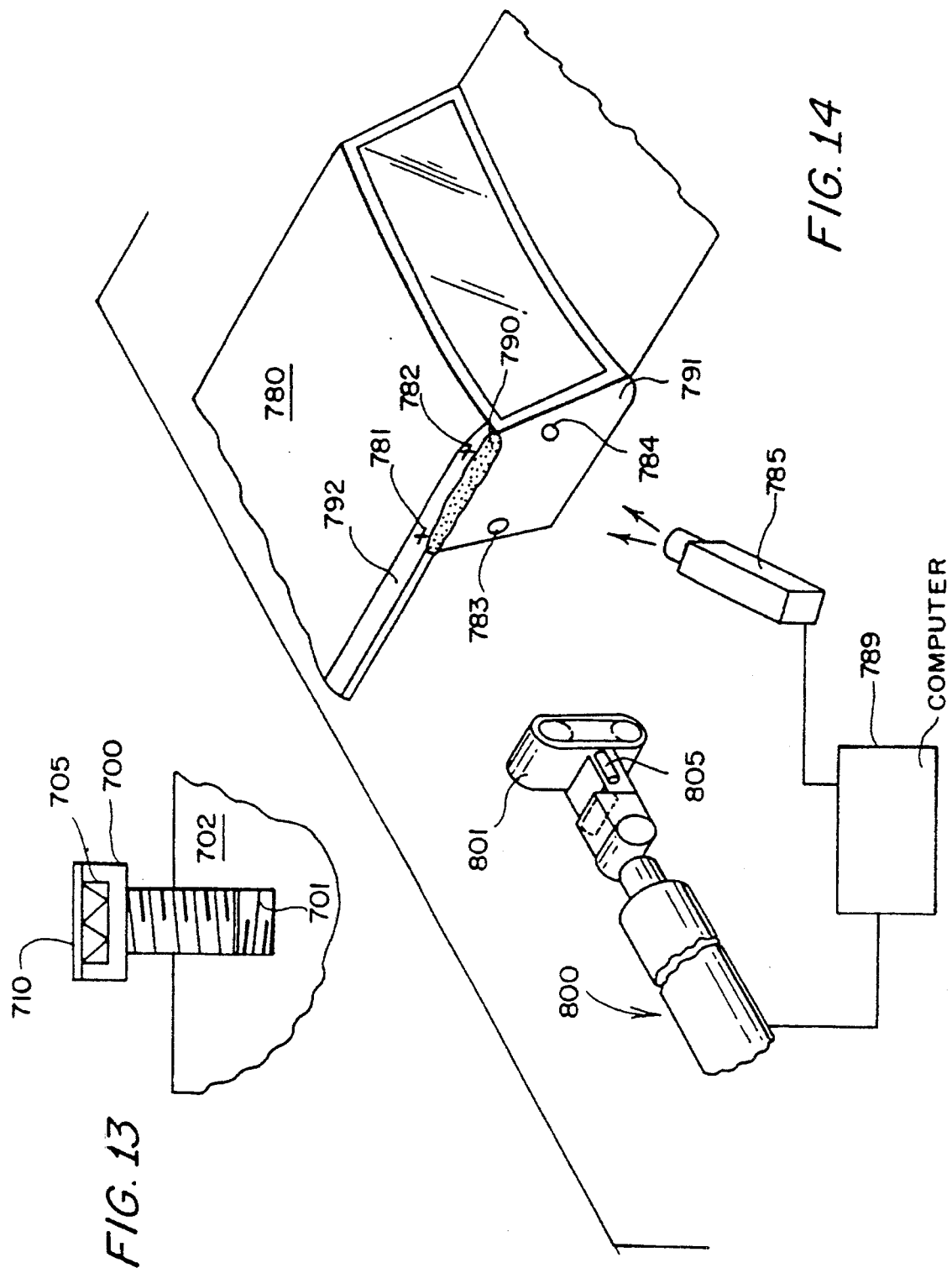

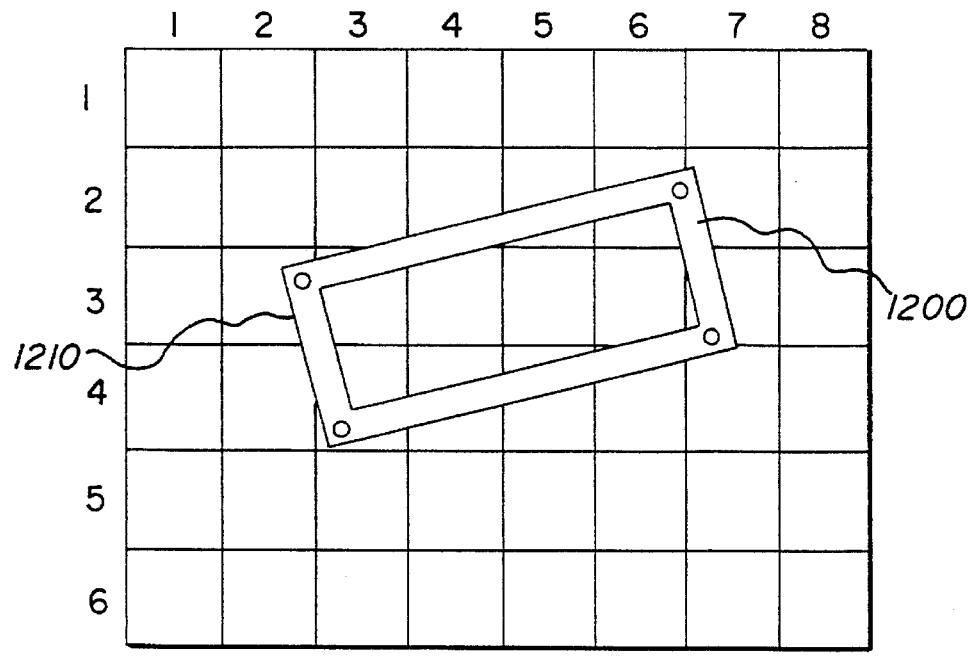
Fig. 20
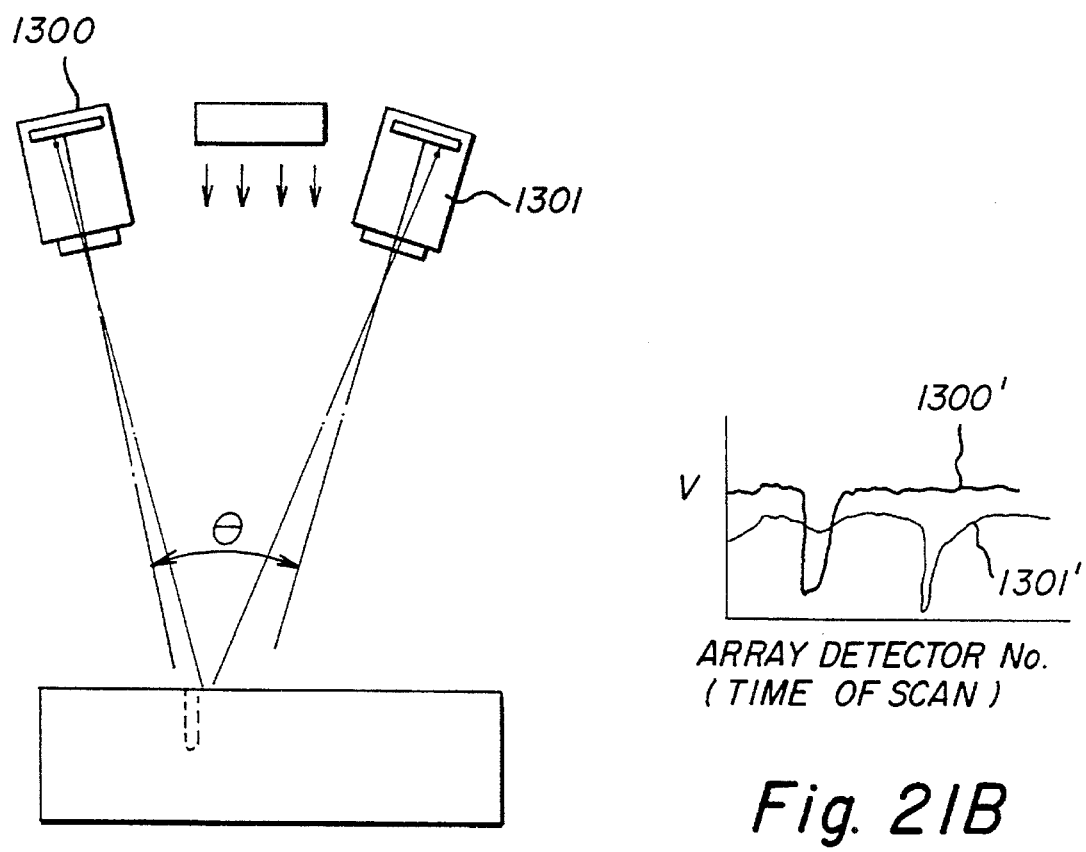
Fig. 21A
ARRAY DETECTOR No. (TIME OF SCAN)
Fig. 21B

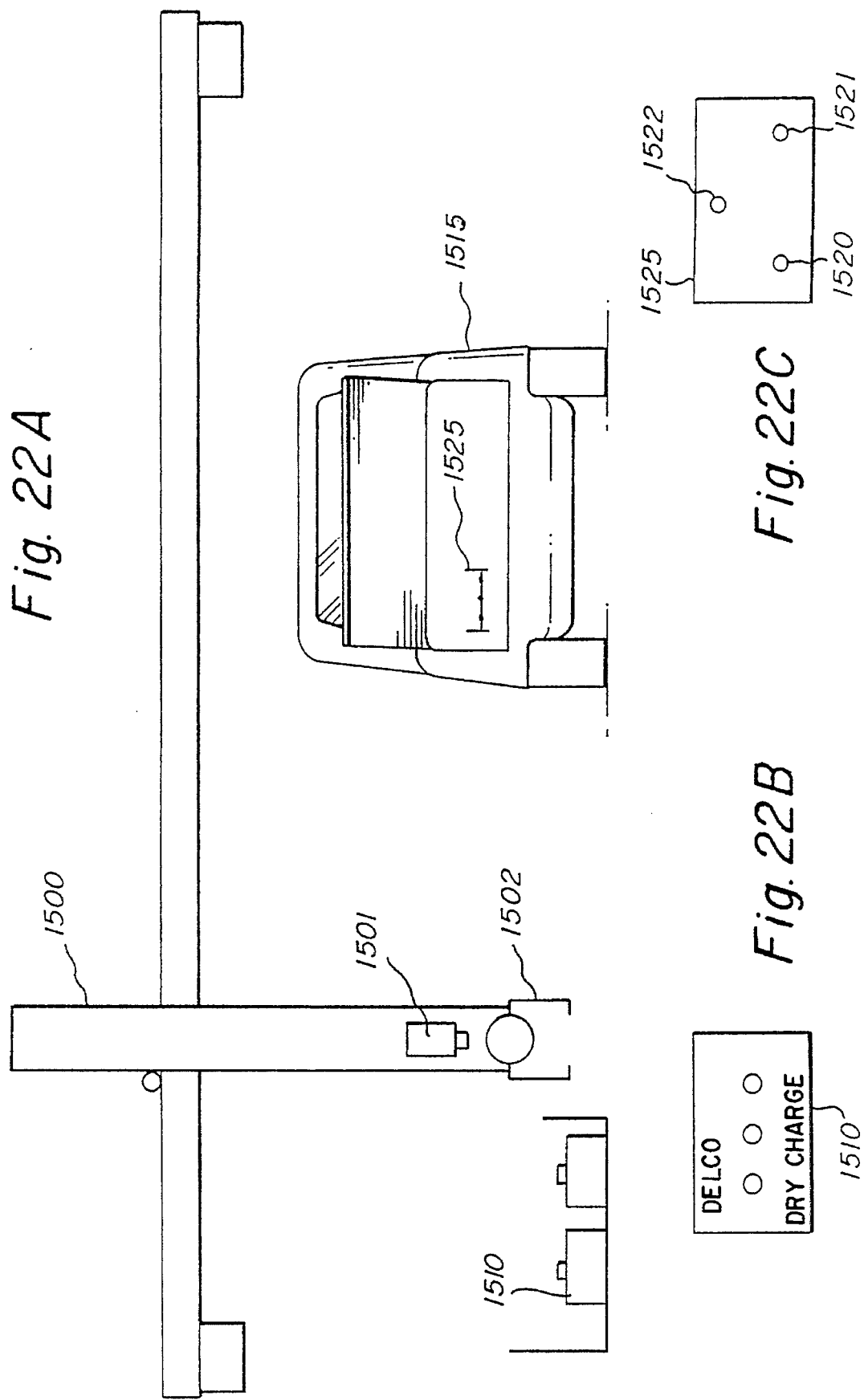

ROBOT VISION USING TARGETS

This application is a continuation of application Ser. No. 07/393,119, filed Aug. 10, 1989, now abandoned, which was a continuation of application Ser. No. 07/096,640, filed Sep. 11, 1987, now abandoned, which was a division of application Ser. No. 06/933,256, filed Nov. 20, 1986, now abandoned, which was a continuation of application Ser. No. 06/660,042, filed Oct. 12, 1984, now abandoned, which was a continuation-in-part of application Ser. No. 06/348,803, filed Feb. 16, 1982, now abandoned.

FIELD OF THE INVENTION

This invention relates to methods and apparatus for determining the position of an object and guiding robots or other automation to handle or work on said object. It is a continuation in part of my previous application Ser. No.200,401 entitled "Fiber Optic Based Robot Controls".

There are many instances in which it is desired to know the position of an object. In the manufacturing field, such instances include the position of objects along mass production lines, particularly those which are highly automated. For example, in a mass production line, it is frequently necessary to know with considerable precision the position of an object suspended from a conveyor system. This is particularly true in automated systems involving the use of robots for it is fundamentally necessary that the object be in a known position, relative to the robot, before the robot can execute a desired manipulation of the object.

In some instances, mechanical means are used to position the object and/or to orient the object in proper position for automated manipulation. For many applications, however, it is necessary to provide "vision" in order to determine the position of an object. This is particularly true in the case of robots which can perform a myriad of physical manipulations, all automatically. It is well recognized in the field of robots that robotic "vision" is one of the major obstacles to much wider use of robots which are presently quite sophisticated in terms of the manipulations of which they are capable.

Specifically the problem in plants of operationally using robots to handle or work on random parts on continuous conveyors is an enormous one. Since such conveyors are omni present in plants of all types, this problem must be effectively dealt with, if large scale robot usage is to become a reality.

In doing so, there are many types of electro-optically based "machine vision" systems which can be utilized.

This invention relates to methods and apparatus for determining the position of an object and guiding robots or other automation to handle or work on said object. It is a continuation in part of my previous application Ser. No. 200,401 entitled "Fiber Optic Based Robot Controls".

There are many instances in which it is desired to know the position of an object. In the manufacturing field, such instances include the position of objects along mass production lines, particularly those which are highly automated. For example, in a mass production line, it is frequently necessary to know with considerable precision the position of an object suspended from a conveyor system. This is particularly true in automated systems involving the use of robots for it is fundamentally necessary that the object be in a known position, relative to the robot, before the robot can execute a desired manipulation of the object.

In some instances, mechanical means are used to position the object and/or to orient the object in proper position for automated manipulation. For many applications, however, it is necessary to provide "vision" in order to determine the position of an object. This is particularly true in the case of robots which can perform a myriad of physical manipulations, all automatically. It is well recognized in the field of robots that robotic "vision" is one of the major obstacles to much wider use of robots which are presently quite sophisticated in terms of the manipulations of which they are capable.

Specifically the problem in plants of operationally using robots to handle or work on random parts on continuous conveyors is an enormous one. Since such conveyors are omni present in plants of all types, this problem must be effectively dealt with, if large scale robot usage is to become a reality.

In doing so, there are many types of electro-optically based "machine vision" systems which can be utilized.

Historically, these systems have been based on reflective viewing of objects through their gray scale levels which poses extremely difficult problems. The trend is thence to ever more complex systems, which runs counter to good plant reliability.

This inventor, for example, has been involved in the installation of nearly 1,000 electro-optical sensor units in plants of varying types for inspection. Substantial difficulties have been encountered when such electro-optical image based sensors were utilized to obtain part images, particularly in reflection.

When one considers that the robot based system must achieve a reliability far higher than even these inspection based units, in order that it not ruin the product, drop it on the floor etc., it becomes apparant that a simple and reliable means of solving these problems is required.

This invention seeks to illustrate such means. In particular, solution is possible if one restricts the problem simply enough to targeted objects. This then leads to the possibility of tracking the parts or the containers, conveyors etc. so targeted, possibly using further sensors if required to find parts within these containers, instrumented grippers or the like.

BACKGROUND

The recent application by the inventor, Ser. No. 200,401, of which this application is a continuation-in-part, illustrated in the embodiment of FIG. 13, instrumented monorail and walking beam conveyors utilizing fiber optics directed through portions of the conveyor apparatus which could be illuminated on demand in order to provide one or more targets for tracking or homing purposes using robotic or other automation.

Also described in Ser. No. 200,401 are many other novel features of interest. These are:

a) The general concept of use of such 'active' lighting in automation and particularly the use of fibers therefore.

b) The use of 'active detection' wherein the light is directed from the robot into one end of a fiber, and sensed at the opposite end of said fiber.

c) The use of other materials than fibers, for example, translucent fixtures of teflon or ceramic.

d) The use of multiple target points on the illuminated piece to be tracked.

e) The use of blow-offs to keep the targeted fixtures clean.

f) The use of pulsed or modulated light sources discrimination against background noise.

g) The use of light sources and electro-optical sensors both located on robot where the light source of the robot is directed to a predicted entrance point of the fiber(s) and the light emanating from the opposite end of the fiber(s) is sensed by the camera of the robot. Two robots for example could be used, one to light the part or fixture, the other to sense it.

g) In addition, the copending application described how to track conveyors carrying parts and made reference to the tracking the parts themselves.

OBJECT OF THE INVENTION

It is an object of the present invention to provide a method and apparatus for determining the position of a targeted object or object carrier. It is a further object of the invention to provide such method and apparatus having particular suitability for providing robotic "vision" and to disclose practical system based thereon.

It is further intent of this invention to expand the previously disclosed concepts beyond simply the fixtures themselves and the parts within the fixture, to the targeting and identifying of containers and parts of all descriptions, for example to baskets, trays, cartons, tools for pickup, parts in warehouse bins, and indeed the parts themselves.

In addition, this invention elaborates further on the use of other targeting materials than fiber optics, not only transmissive materials of other sorts, but objects such as glass beads, drilled fascets, casting risers and the like.

It is a further purpose of this invention to show other means in the sensing which can give improved target position and data. Particularly of interest are those related to apparatus such as Pinkney, et al., U.S. Pat. No. 4,219,847.

It is further a purpose of this invention to show specifically how certain parts in overhead monorail conveyors can be picked off under random situations with the high reliability needed to work in plants.

It is further a purpose of this invention to show means for outlining the edges of targets for use with stereo cameras or other sensing means not necessarily based on point targets.

It is a further purpose of this invention to show means for coding the various fiber input or outputs, or other targets by use of colors or modulation frequencies. This is also possible with inserted glass beads and retroreflectors.

Finally, it is a desirable purpose of this invention to show that standardized systems, based on such tracking, can be used across the total spectrum of manufacturing and industry with very litte change as long as one sticks to certain target principles. This allows the wide spread use of reliable guide robots at affordable cost.

SUMMARY OF THE INVENTION

Recent copending applications by the inventor, incorporated by reference:
1. Ser. No. 348,803 "Method and Apparatus for Automatically handling Assembling ("Targets") or working on objects"
2. Ser. No. 453,710 "Robot Calibration"
3. Ser. No. 592,443 "Robots and Manipulative Arms"
4. Ser. No. 323,395 "Robot Tractors"
5. Robot Tractors, Vehicles, and Machinery (SN)

disclose novel means for achieving high accuracy, high speed and potentially low cost robot vision in up to 6 degrees of freedom using targets affixed on, or forming part of, an object. In particular it is desirable to construct a control system for a robot which can use certain features of an object to provide accurate solution of a photogrammetric equation to allow up to 6 degree of freedom determination of part location in space with a single camera or multiple cameras.

In the automotive industry particularly, holes in parts are natural features which generally have a precise dimensional relationship to the object as a whole. The reason for this is clear. Most of the holes are used for mounting the object to something else and in that case have to be in the proper position or the object itself will be out of position when so mounted. Examples of this include body panels, instrument panels, water pump covers, radiator brackets, etc.

In other cases, holes are there to allow the assembly of the part together with other parts for functional or decorative purposes. These could include rocker cover rail holes, rocker stud holes and cylinder heads, engine cylinder head bolt holes, various frame holes and the like. In short, a vast number of the parts of cars, appliances, aircraft and other things have holes as their principle feature and in almost all cases, these holes have been either molded, cast, machined or otherwise incorporated into the part in such a way as to be in a dimensionally accurate location, at least accurate enough for the purposes of picking the part, working on it, handling it or what have you.

In Ser. No. 348,803 (Targets) previously filed, it was disclosed that the natural occuring holes in the part could be used as the targets. This is further elaborated on herein.

While holes are of particular interest, there are other features of objects (chosen object features) which can be used as "targets". For example, corners, edge segments, notches and other features, which are defineable in more than one dimension can be considered. (A particularly good example are the corners of objects such as automotive body panels, whose corners are particularly important for control and fitting purposes.)

Obviously, any natural occuring indentations or protrusions and the like can be considered as well and some of these were discussed in the previous case. It is also noted that combinations of features can be used such as 2 holes and 2 corners of a part for example, to comprise the 3, 4 or more targets suitable for the invention.

Returning now to the specific example of holes, there are basically several points that can be utilized to discern the holes. We must remember that a key point of this invention is that to allow a 6 degree of freedom solution such as Pinckney et al (U.S. Pat. No. 4,219,847) to be made, we only need to know the position of three or four holes in any one view. That is, we only have to locate those holes and generally no more. Other features such as edges and other character lines, etc., are of no meaning since those are all known relative to the hole locations. The key point is then to find the holes (corners, etc.) and to "lock on" them in a mode that the camera unit can stay locked onto the holes throughout whatever operation such a handling or working is contemplated.

The leads to several operational possibilities. While discussed relative to holes, the arguments are general to corners and other features.

1. Scan the total part image and find the holes. Once the holes are found, determine the shape of the hole, the size of the hole, or the relative locations of the holes, confining analysis to those holes which are to be considered as targets.

While it is desired on every part to use the same holes as targets, certain alternate holes or other features can be held in reserve in case the image of the principle target holes is obliterated or obscured. Once the holes are found, one need not scan other portions of the image. The sensory unit only needs to lock onto the holes.

2. Clearly, the above is probably the way to go in many cases. However, another clear case is where the boundaries of the part such as the edges of a basically rectangular cylinder head is known. Having found the edges of the part, one can immediately segment the image into sections and simply scan for holes in certain areas of the field of view. It is likely on a well manufactured part such as a cylinder head, that one could almost immediately go to the zone on which the desired holes were located and simply confirm that they are of roughly the right diameter so as to act as the target holes.

All holes are generally round and it is considered highly unlikely that non round holes would be normally utilized in parts except for the purpose of target indicators. This naturally makes them easy to find as targets if they are triangular for example but obviously would require special operations to put them there. One excellent example of this is to incorporate three or four triangular punches into a punch set used to punch out inner panels of car doors. If one just punches a few extra holes which are triangular or other odd shapes, one can immediately identify that those are the target holes in any view of that part.

Before getting further into the control rationale, one can also make a point of saying that, in general, holes, corners and other features are front lit. In other words, the part cannot be illuminated from behind—for example, in let's say the blind threaded rocker cover rail mounting holes in a cylinder head, one has to look at the reflected image from the front. Reflected images often don't give good contrast which requires a "front end" processor to help make up for this as discussed below.

In the cover rail case the hole is clearly defined as being located at the surface in which it breaks and almost inevitably appears, in reflection, as a dark image on a bright (rail) background. Naturally the brightness is dependent greatly on the lighting and the reflectivity of the part. But in all cases, one can light these parts so that the light comes back from the normal surface and is absorbed into the hole. It is extremely unlikely except for the threaded reflective facets of a threaded hole at certain angles that one gets a bright reflected image from a hole unless of course the hole is extremely shallow (and the bottom is seen; this can be avoided by viewing at oblique angles).

The other principle case is backlit holes (or corners, etc.) as in a sheet metal stamping which has been punched out or a plastic part such as a instrument panel which has numerous through holes as well as several blind holes. The blind holes however are generally the mounting holes for the panel and are probably better controlled in their position relative to the rest of the perforated panel. However, the other holes can be used as well.

DETAILED DESCRIPTION OF PREFERRED EMBODIMENTS

There follows a detailed description of preferred embodiments including the drawings in which:

FIG. 1 is a diagrammatic side elevation view of an overhead conveyor system utilizing the present invention, FIG. 2 is an enlarged diagrammatic perspective view of hook 14 of FIG. 1.

FIG. 3 illustrates a complete system for the picking of transmission clutch parts off of overhead monorail conveyors in an automatic transmission plant. The sensor is of the general type described by Pinkney et. al, utilized to track the conveyor carrier(s) which are targeted by means herein disclosed. Optionally, an additional sensor or analysis means on the robot may be used to find the part within the carrier.

FIG. 7 illustrates a part targeting embodiment employing drilled holes.

FIG. 8 illustrates a part targeting embodiment wherein said targets are cast into the part or are appendiges thereto.

FIG. 9 illustrates a part targeting embodiment wherein said targets comprise directional or color reflective elements which may be molded or pressed in.

FIG. 13 illustrates reusable targets for parts.

FIG. 14 illustrates a method of assembling cars according to the invention.

FIG. 20 illustrates an embodiment of the invention illustrating matrix data array segmentation scheme, with robot tracking.

FIG. 21A illustrates a two camera coincidence stereo front end processor (FEP) and FIG. 21B the output thereof.

FIGS. 22A, 22B and 22C illustrate use of writing on a battery as a FEP application

DETAILED DESCRIPTION OF THE PREFERRED EMBODIMENTS

Incorporated by reference are other copending applications by the inventor. Many embodiments therein illustrate sensors and hardware of use in this disclosure.

1. Electro-optical sensor systems for thread and hole inspection Ser. No. 64,867
2. Method and apparatus electro-optically determining the dimension, attitude and location of objects: Ser. No. 34,278

3. Method and apparatus for determining physical characteristics of object and object surfaces: Ser. No. 15,792
4. New photodetector array based optical measurement systems: Ser. No. 163,290
5. Electro-optical inspection, Ser. No. 073,226
6. Co-ordinate measuring method and device, Ser. No. 201,081
7. Electro-optical sensors with fiber optic bundles, Ser. No. 173,370
8. Electro-optical surface roughness measurement and control Ser. No. 240,459
9. Apparatus for determining dimensions, Ser. No. 134,465
10. High speed electro-optical inspection, Ser. No. 203,866
11. Fiber optic based robot controls, Ser. No. 200,401
12. Electro-optical sensors for machine tool and robotic inspection. Ser. No. 247,399
13. Electro-optical systems for control of robots, manipulator arms and coordinate measurement machines Ser. No. 262,497
14. Method and apparatus for determining wear or breakage of tools and other defects Ser. No. 323,397
15. Electro-optical systems for detection of leakage and blockage Ser. No. 323,399
16. Productivity improvement via robotic electro-optical part and tool inspection Ser. No. 323,396
17. Robot tractors Ser. No. 323,395
18. Method and apparatus for determining physical characteristics of object outer surfaces Ser. No. 15,614
19. Method and apparatus for determining dimensional information concerning an object (division of Ser. No. 15,792);
20. Method and apparatus for detection of surface deformaties (division of Ser. No. 15,792) Ser. No. 234,728
21. "Linear" continuation of Ser. No. 015,792
22. "Circular" continuation of Ser. No. 015,792
23. Optically controlled plumbing apparatus Ser. No. 29,840
24. Optically controlled bathing systems Ser. No. 23,150
25. Electro-optical and robotic casting quality assurance Ser. No. 273,385
26. Controlled machining of combustion chambers, gears and other surfaces including methods for obtaining correct combustion chamber volume in finished engine assemblies.

Figure 1:
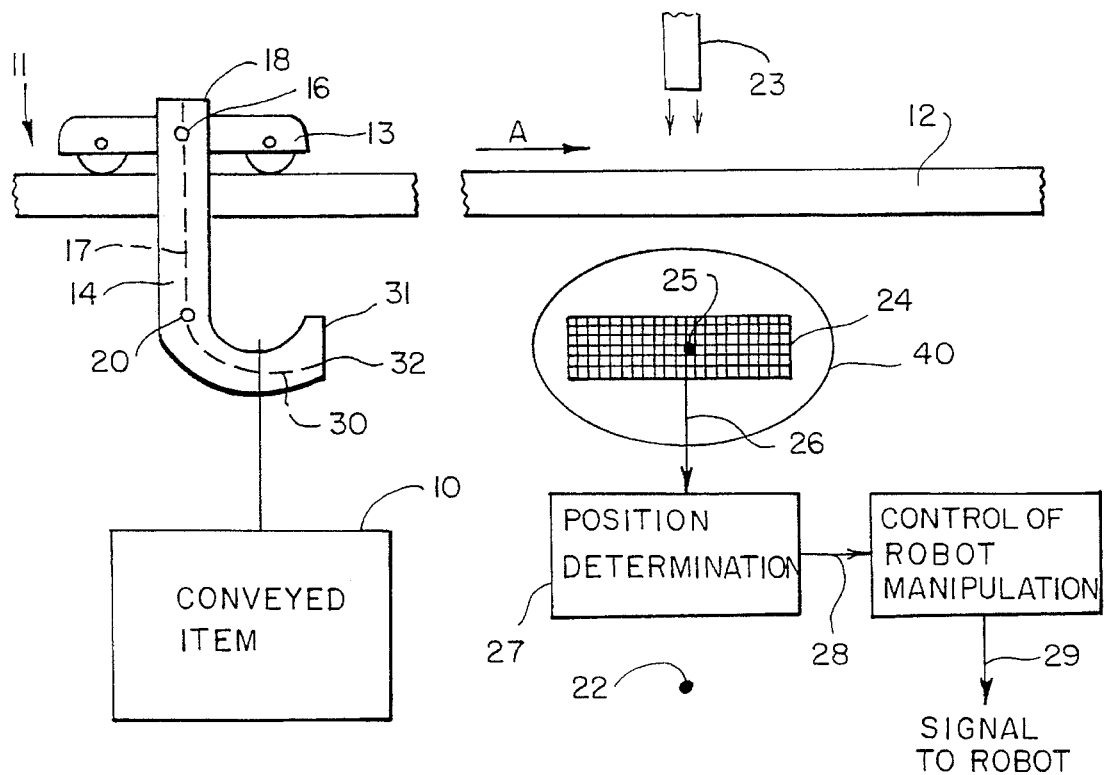

With reference to FIG. 1, an item 10 is shown being moved in the direction of arrow A below an overhead conveyor system 11 generally comprising a track 12 on which a carriage 13 is movable. Object 10 is suspended in any suitable manner from a hook 14 secured to carriage 13. Hook 14 includes an aperture 15 for a bolt 16 for securing hook 14 to carriage 13. A fiber optic 17 is embedded within hook 17 and has a light receiving end 18 in a surface 19 of hook 14 and a light emitting end 20 in a surface 21 of book 14. Fiber optic 17 can be any fiber optic element such as a single fiber optic or a bundle thereof, of which several are commercially available. A plastic 'corfon' fiber optic element is quite suitable.

In FIG. 1, it is assumed that it is desired to determine the position of item 10 suspended from hook 11 when item 10 is at a general location designated 22, in FIG. 1. It is also assumed in FIG. 1 that item 10 is in a known position relative to the position of hook 14.

A light source 23 is positioned above track 12 to direct light downwardly such that it will be incident on the upper surface 19 of hook 14 of carriage 13 when a carriage is positioned below the light source.

A light detector 24, in this case a scanning matrix photo detector camera comprising a lens and a detector array comprised by a plurality of horizontal rows of discrete photo diodes, is positioned adjacent the conveyor so as to be adjacent hook 14 when conveyed item 10 is located generally in position 22. More particularly, when the conveyed item is in position 22, the light emitting end 20 of fiber optic 17 is imaged by the camera lens 40 onto the matrix array which provides real time information as to the location of hook 24.

In a typical case, illustrated in FIG. 1, the light 25 emitted from end 20 is imaged to form a spot 25 on four adjacent photo diodes of array 24. As the photo diode array is scanned, an output signal 26, indicative of the position of the spot of light 25 on array 24 is conveyed to suitable means 27, such as microcomputer, to determine the position of hook 14, and thus item 10, relative to any known position, such as the position of a robot, or the position of detector array 24. A signal 28, indicative of the position of hook 14 and/or item 10 is then conveyed to suitable robot control means for control of a robot, not shown, for manipulation of the hook 14 of conveyed item 10. A signal 29 controlling the robot thus includes positional information concerning the hook 10 or item 14 to be manipulated by the robot.

It will be readily apparent that the matrix array in FIG. 1 provides positional information in the x and y directions in the plane of the drawing. It is also possible to readily provide information concerning position in the z axis. For example, as shown in dotted lines in FIGS. 1 and 2, a further fiber optic element 30 may be embedded in hook 14, extending from horizontal upper surface 19 to front surface 31 which extends vertically and transverse to the plane of the drawing.

Thus, a further linear photodetector array, positioned to detect light emitted from light emitting end 32 of fiber optic 30 would provide a signal indicative of the position of hook 14, and thus item 10 if desired, in the "z" axis, that is, in a direction transverse to the plane of the drawing. This signal would be processed in the same manner as signal 26 to provide a three-dimensional determination of the relative position of the conveyor hook and/or suspended item such as its position relative to a robot. Alternative means utilizing additional targets for providing three-dimensional data as to hook location using multiple targets are disclosed below.

Figure 2:
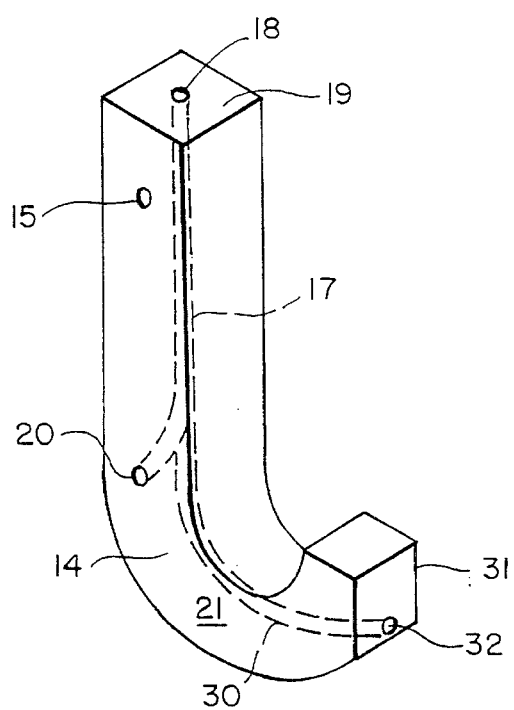

In the embodiment depicted in FIGS. 1 and 2, the elongate light conducting means is shown embedded in hook 14. In some instances, as where hook 14 is a monolithic cast metal item, it may be more convenient to fix the fiber optic to the hook in some other way as by simply gluing or otherwise adhering to an outer surface thereof. In that event, however, it is preferred to provide a housing for the fiber optic to prevent damage in use. This is readily achieved by providing a groove or slot in a surface of the hook, in which the elongate light conducting member can be laid and thereafter covered with a protective material, preferably opaque.

Where the invention is utilized to determine the position of a member of like objects, such as the position of a plurality of identical hooks 14, it is preferred that the position of the light emitting end or ends of the elongate light conducting member are in substantially identical position on each item. Where this is not practical, or where more precise position determination are required, the position of the light emitting areas of each object may be calibrated.

In the embodiment of FIG. 1, the light conducting members are fixed to hook 14. It will be readily apparent, however, that the members be fixed to suspended item 10. In the latter event, position of suspended item 10 is determined directly whereas, in the latter case, it is determined indirectly by determining the position of hook 10 and by knowing the position of a suspended item relative to hook 10.

Figure 3A:
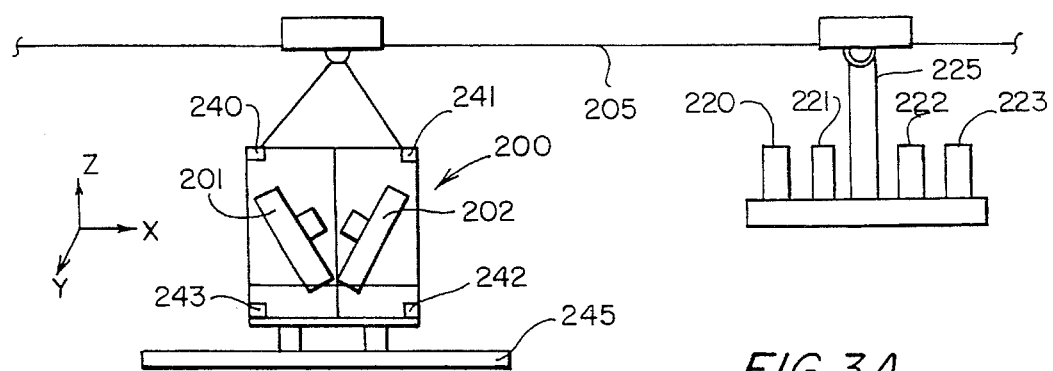
Figure 3B:
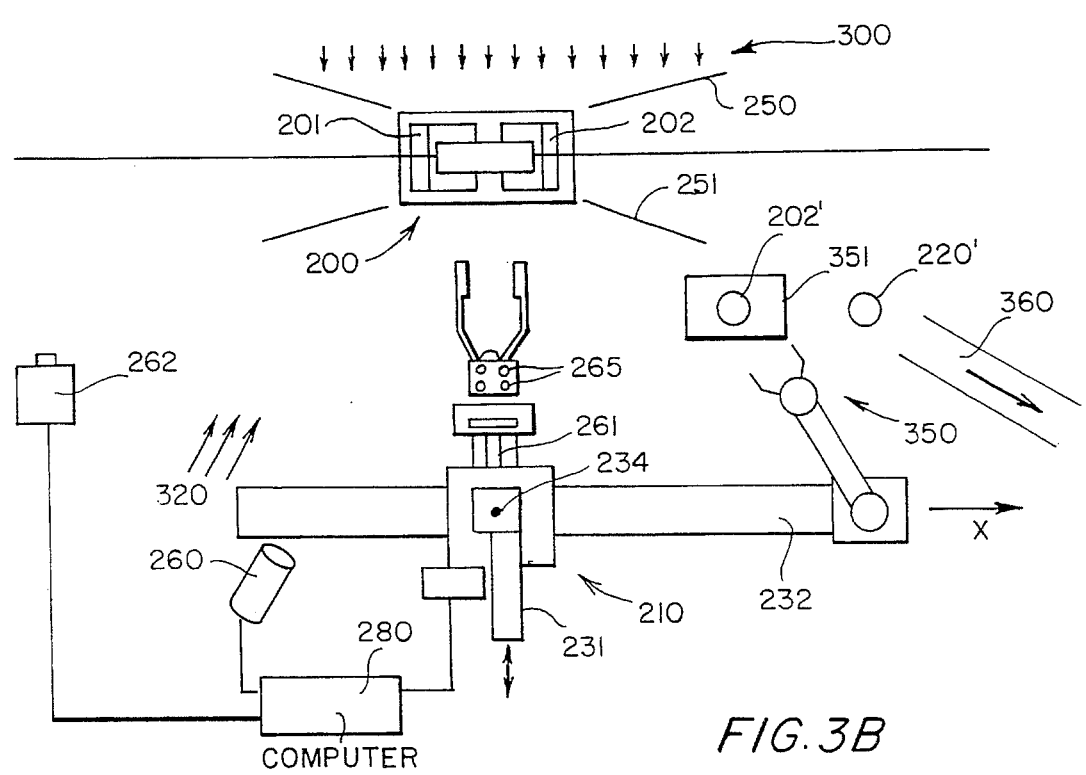

FIGS. 3A and 3B illustrate a basic application of the invention to an important sector of robot usage, that of taking parts off or placing parts into continuously conveyed containers or transport media. There is substantial amounts of labor worldwide utilized in this material handling procedure. In addition, many assembly operations require a human to first take a part, for example, off a conveyor, (for example, an overhead monorail conveyor here illustrated) and assemble it to some other part. He may have to then put the part back on such a conveyor. In other words, only if the conveyor interaction problem can be solved, can the assembly process be automated.

A particular embodiment of the invention is shown here utilized to remove transmission clutch parts off an overhead monorail carrier. In this particular carrier, 200, there are two parts, 201 and 202, resting in a pocket of the carrier. To keep the cost low, the carriers are typically made out of angle iron, bent rod etc. and are not overly precise in any direction. In addition, they are conveyed often from an overhead rail 205 and can swing in the direction of motion, side to side and twist over limited angles. They can vary easily in their position from the reference point of the monorail ±½ inch and as time goes on, they degrade still further due to repairs, substitutions etc.

Rather than attempt to build highly precise conveyors, it is of extreme interest to provide a robot system that can deal with this particular type of conveyor, not only allowing one to retrofit existing plants, but further keeping future conveyor costs low—at the price of certain additional sophistication in the robot hardware. As can be seen from this particular example, however, the embodiment of the invention provides a system which can be made at low cost, much less than that of providing precision conveyors capable of being used with robots without the invention.

As shown in the top view, a robot 210 is positioned to grab the part off of this particular monorail choosing one of the two parts in this particular carrier. At a later time, it may choose any one of parts such as shafts 220 to 223 located in another carrier 225 on the same monorail, to be used in assembling with the first parts. For example, robot 350 is used to assemble the parts pulled off the conveyor by robot 210.

The robot 210 can be of any particular type. However, a cartesian coordinate robot is generally preferred and a specialized one for this purpose is shown in the drawing. It is noted, however, that polar coordinate robots can be utilized, although they require much more control sophistication. A polar coordinate robot on moving linear slides parallel to the conveyor can also be utilized but requires added cost.

As shown, cartesian coordinate robot 210 has an arm 231 moving in and out toward the conveyor line 205 and it moves along an x axis slide 232 parallel to the conveyor. The third axis is the vertical axis or z axis out of the plane of the drawing 234.

Figure 4:
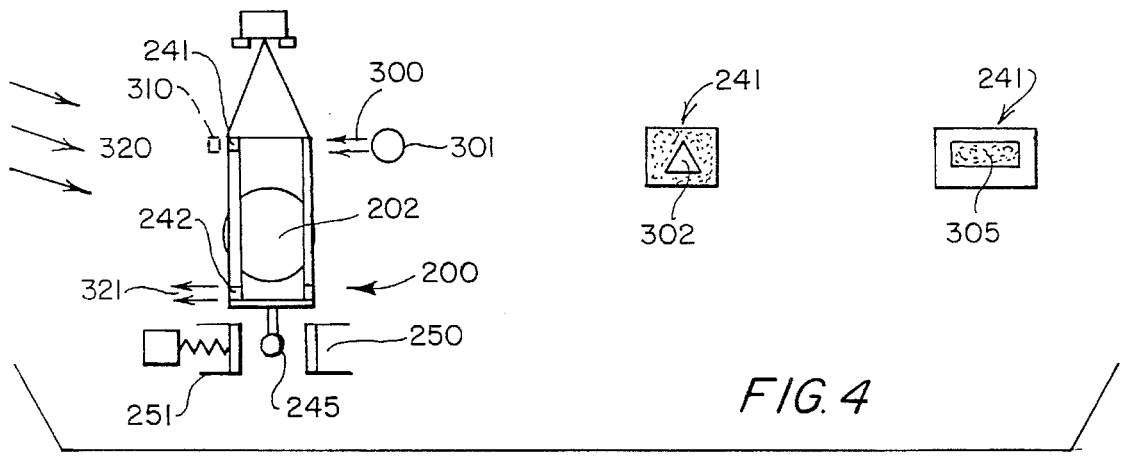
FIG. 4 illustrates target embodiments on the carriers used in FIG. 3.

In this invention, the carrier has been provided in this example with four targets located, in this example, at the four corners of the carrier, 240 to 243. These targets can be any type, for example those described in this application. The use of four such targets is not necessary, but is preferable in many cases to provide a full 6 axis solution of object position with redundancy. Three targets is sufficient to provide the solution alone. The carrier also contains, desirably in this case, a snubber rail 245 located beneath the carrier which can contact certain mechanical guides such as 250 and 251 to restrain the side to side motion. These guides are also shown in the end view (FIG. 4). They can optionally be spring loaded as shown such as 251 to keep the snubber up against the stationary guide 250. A lead-in on the snubber guides is shown in the top view.

FIGS. 3A, 3B and 4 illustrated targets such as the four as shown affixed to the carrier. In this case, these targets provide a signal from which the sensing camera unit such as 260 can lock on. This camera unit can be located either on the robot arm as 261 or external to the robot as 260 (shown mounted by the side but also mounted above the station). If it is external to the robot, it may also be desirable to also have targets such as flashing LEDs, 265 on the end of the robot arm which can also be tracked to provide relative data. Both types 260 and 261 can be used to provide data from different points of view.

When the robot sensor such as 260 has locked onto the carrier (or other item, see subsequent embodiment) it can then track this conveyor even in its side to side motions in a reliable manner due to the very high signal to noise ratios of the targets as will be discussed below. This is vastly superior to looking at the parts or carriers from their gray level images in this kind of swinging and uncertain environment. It is noted that the referenced Pinkney invention or other photogrametric solutions can offer high resolution data in up to 6 coordinates, x, y, z, roll, pitch and yaw. This is fully sufficient and often more than sufficient to accomplish the job, particularly if constraints such as the snubber guide rails 250/251 shown, are utilized to restrain the motion in one or more axes.

Once the main camera unit such as 260 has locked onto the conveyor and can compute its position for the feeding to the robot command computer 280, then a second system (such as 261), either using a different camera or simply different lighting, circuits etc. can tell where the part is in the carrier.

An important feature of the invention is the use of one camera unit to track the targeted conveyor (or other object) while a second subsystem, even with the same camera, senses the part within the conveyor carrier or on it. Such a second camera or subsystem is described in reference 2, and can provide up to 5 axes of data itself (x, y, range, pitch and yaw). This system can be right in the gripper as in FIG. 8 the referenced copending application (Ser. No. 200,401).

It is noted that the sensing of where the part is in the carrier does not necessarily have to be made at the robot station. It could be made upstream, using for example sensor camera 262. This serves the additional purpose of signaling the robot system if any out of specification situations exist, so as to abort the attempt to grab the part. This could be a badly mangled carrier, a carrier with no parts at all, a carrier with the wrong part, etc. Thus, identification of the part obviously can be done as well as sensing its location on the carrier, pallet, or whatever.

Once the decision has been made as to where the part is and the fact that it's a correct part, the robot moves in to remove it or conversely to place another part back on the carrier. In this case, the control computer 280 of the robot takes the data as to the coordinate position of the targeted carrier and continually updates the robot's information. With a cartesian coordinate axis, it is particularly easy to make this approach since one can simply run parallel to the conveyor (x direction) and only take out the differences in position relative to the parallel line of motion. While this can be done with a polar coordinate system, it is much more difficult to do dynamically. In any case, one need follow the carrier only in an approximate sensor using the gripper, and possibly other sensors to take up the difference.

The tracking target approach, for example, using hardware such as disclosed in Pinkney or a twin stereo approach with two cameras, can be accomplished using a camera tracking both the gripper and the carrier conveyor (or part) and/or with a camera mounted on the robot arm itself. The reason why this is so successful is that it tracks targets which can have, and maintain, high visibilities even in an industrial environment. These targets can be differentiated by means of intensity, color or shape. Any and all can be utilized by this system.

For example, in the end view of FIG. 4, light 300 from light source 301 behind the carrier can be provided which illuminates the targets 240–243 at the four corners (or any other place). These targets can be simple apertures in plates such as circles, squares, triangles, etc.—whatever is distinctive and can be discerned by a computer vision camera such as 260 or 261. A triangle aperture 302 in target plate 241 is shown for illustration.

Alternatively, the targets can be comprised of color filters such as 305 and indeed a different color could be used for each different target (240–243) or different part carriers if desired to automatically code which is which, if this is a problem, as it could be in certain more random applications. In this case, when utilized with white light source 300, the color of the target is an immediate indicator. However, in some industrial environments, maintaining a colored filter may be harder than a simple slot.

It is noted that when utilized as shown, with the light source behind, it may be desirable to put a diffuser such as ground glass 310 (dotted lines) in the slot or near the slot (but not necessarily on the carrier) such that the light is directed over a range of directions. Other more directional diffusers such as diffraction gratings, prismatic devices and the like can also be used where more light is desired at certain angular locations such as the approach path of the robot, or in the direction of camera 260 for example.

It is also, of course, possible to use the fiber optic based targets such as disclosed in FIGS. 1–2 above and in Ser. No. 200,401.

A final type of target of use on a system such as this is a retro-reflective target, such as plastic prismatic retro-reflectors, retro-reflective tape, lectilinear material and the like. This is shown as target 242 in FIG. 4. In this case, a light field 320 must be provided to illuminate this. If reflectors having a high degree of retro-reflective capability are utilized, the light source should be coming from the same angle as the sensor (e.g. from 260). The source could either be fixed or mounted on the robot. The reflected light field is shown 321 directed back along the incident path.

Figure 10:
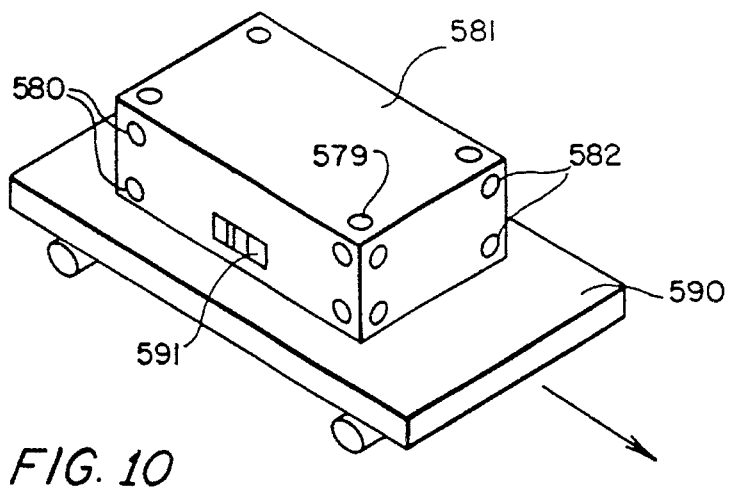
FIG. 10 illustrates a robotic system employing targeted boxes randomly spaced on a roller conveyor, utilizing either targets printed onto the box, fibers, or retro-reflectors.

Let us now consider the question of targeting the parts themselves or a container of parts such as carton 579 travelling on a pallet in the conveyor of FIG. 10 wherein the targets are simply printed on.

There are many means of implementing such targets on parts, although this is obviously somewhat more difficult since one has to consider the function of the part and often it's aesthetics as well. From the point of view of the robotic system, however, targets need to be such that at least 3 of the 4 targets for example are visible in order to provide a satisfactory 6 axis solution to the photogrametric equations. Under certain circumstances, where there are more constraints, perhaps only 1 or 2 targets need be visible.

In continuing the example of FIGS. 3A, 3B and 4, it is noted that it is sometimes desirable to have an auxilliary robot such as 350 (possibly with polar coordinates as shown) to take parts such as 202' which robot 210 has pulled out of the carriers and loaded onto an assembly fixture 351. This robot then assembles different parts such as the shafts 220' for example that have also been pulled off and puts the two parts 202' and 220' together and then shoves the completed assembly down on a chute onto an outfeed conveyor 360.

Alternatively, robot 210 can be utilized also to perform the assembly operation particularly if it is provided with rotation about the y axis. A dual robot system, however, is faster since one can be assembling while the other retrieves more parts.

The converse is also true, the previous assembly can be going on while robot 210 puts the assembly back on a monorail conveyor of the same type. For example, in this particular application, a second conveyor can be located right under the first conveyor 205 on which the assembled parts were placed. This conveyor could be floor mounted or overhead. Robot 210 could also turn around 180° and put a completed assembly on a conveyor parallel to 205.

FIG. 5A

Figure 5A:
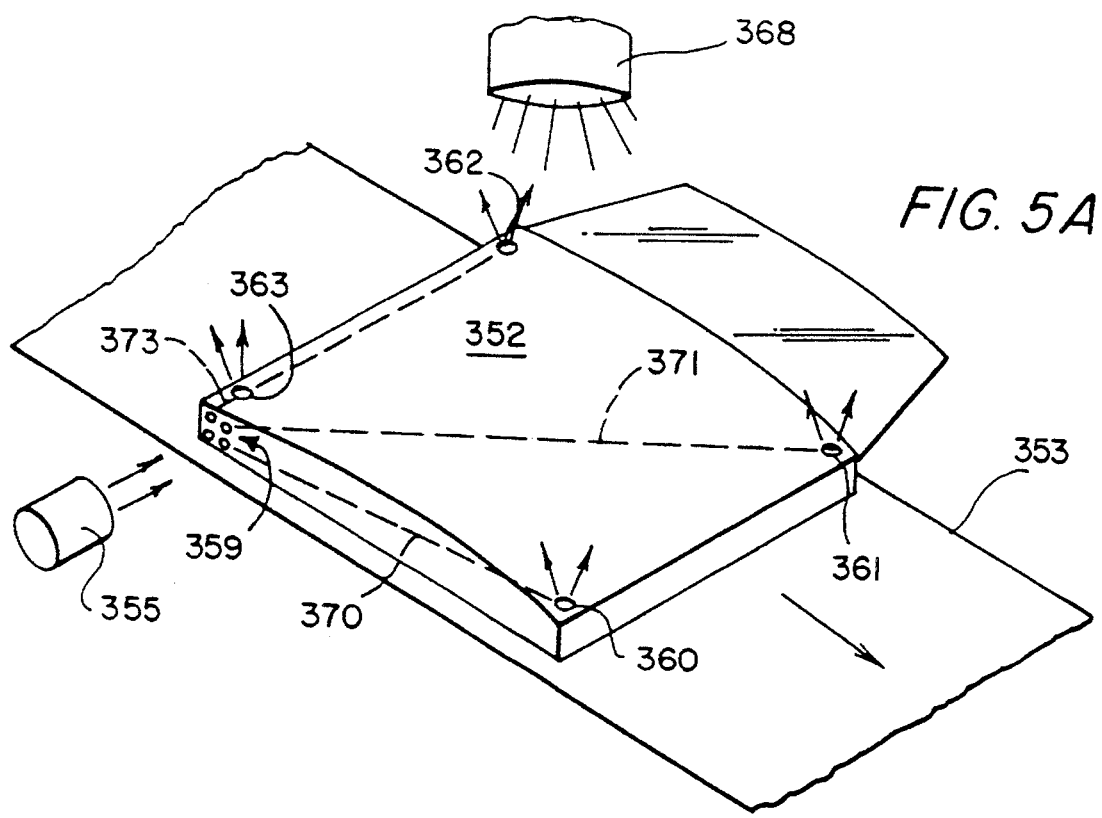
FIG. 5 illustrates an embodiment showing methods of targeting a plastic door panel having built-in optical fibers.

FIG. 5A illustrates a car door targeted according to the invention 352 travelling on a conveyor 353. As it passes a light source 355, four fiber ends 359 are simultaneously illuminated and light eminates from the opposite fiber ends 360 to 363 which then form the targets. These fiber ends are flush with the door panel which itself may be plastic such that the plastic fiber blends with the plastic door. Indeed, the fibers carrying the light 370 to 373 may be cast right into the plastic in the injection mold. They may be in the door panel sheet, laid in just as if they were regular glass fibers in a SMC (fiberglass) door, or maybe carried in or adjacent the ribs of the door (if any). Alternatively, where there's an inner and outer panel, the fibers may be placed in between.

A camera unit 368 looks at the light from the fiber ends 360–363. This camera may be located overhead the conveyor and/or on a robot arm coming in to pick the door up for example.

The light source itself may be pulsed to create a higher signal to noise ratio of the targets relative to ambient light. It is noted that each of the fibers comprising the targets may transmit colors to allow color discrimination on that score. Indeed, one might even think of the fibers 370 to 373 as bundles of fibers. Indeed different numbers or arrangements of fibers and different arrangements of the target ends 360 to 363 could be used such that varying codes were used to deliniate which was which and what door type etc.

It is noted that paint, ink or other film or coating type targets can be sprayed on parts utilizing spray marking guns. Particularly effective for this is in terms of producing nicely shaped targets such as triangles and other items that have a very recognizable shape is the Diffracto TurboJet, U.S. Pat. No. 4,269,874. Clearly, a marking station on the panel for example could be utilized to spray certain targets on with paint. These targets can be provided with special paint such as phosfluorescent, infra red absorbing or ultra violet reflecting, something that would tend to distinguish them under certain types of lighting. They could even be clear coating which would be invisible to the eye but under certain lightings would fluores or absorb certain wavelengths preferentially. The latter would be particularly nice for finished parts. However, any sort of paint could be utilized for example on an unpainted door which would later be painted just as long as it was chemically compatible or would be removed in a normal preparation process.

Figure 5B:
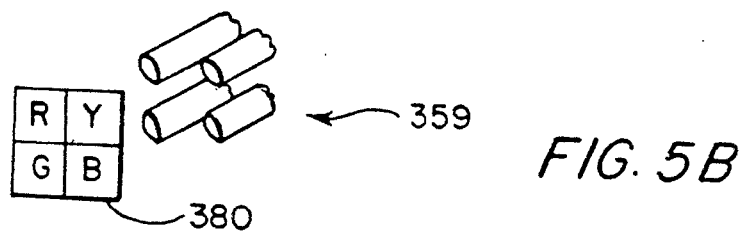

FIG. 5B illustrates the color filter plate 380 which can be placed in front of the group 359 of four fiber ends of FIG. 5A. This color filter plate has filters red, yellow, green, blue as shown which cause the light eminating from each of the fiber ends 360–363 to show those colors for example. These colors could all be infra red or any other colors.

An alternative for differentiating which target is which, is to actually use different light sources for each of the fibers and modulate them at different rates or pulse light on each of the fibers sequentially.

Figure 6:
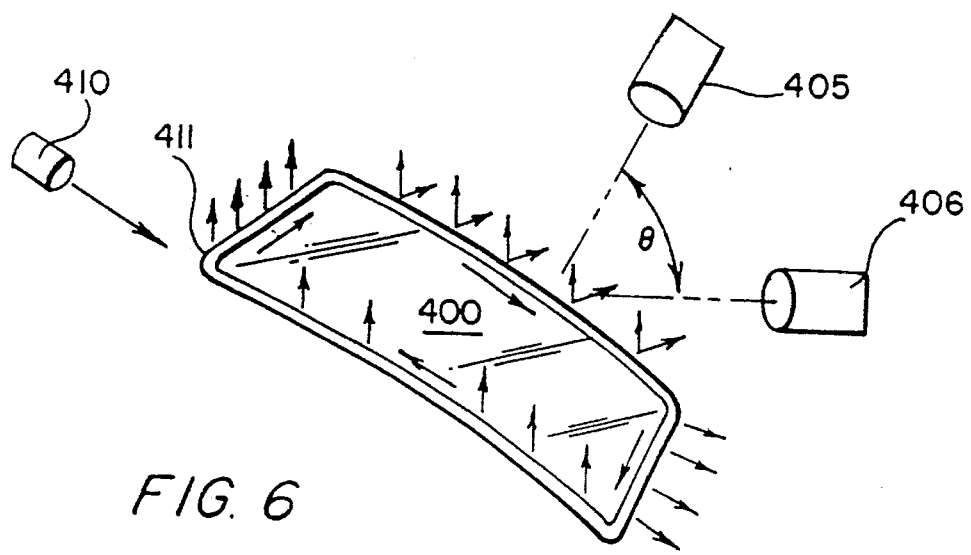
FIG. 6 illustrates a car windshield with lossy fibers to outline its periphery, which is imaged by stereoscopic cameras.

FIG. 6 illustrates another application of the invention, this one being to a windshield 400 the edges of which as well as other features are viewed by cameras 405 and 406 having an included angle, θ between them such that 'stereo vision' in terms of depth perception is provided.

This stereo vision or any other vision of this part is made vastly easier by the deliniation of the object edge provided by the 'lossy' fiber 411 which runs around the periphery of the part eminating or 'leaking' light at each point as it goes when illuminated at its end by light source 410.

While the whole edge has been deliniated in this particular example, it is obvious that only sections of the edges of a part such as this are required for accurate placement of it. It should be noted as well that it allows for actual mensuration of the part itself since the contour of the windshield edge is desired to insure that it will fit into the windshield opening of the car in a correct manner.

The fiber in this case can be cast into the windshield glass at the time of manufacture and could even be a glass fiber itself simply of slightly different characteristics. Alternatively, this fiber could be really just a portion of the same glass made in such a way as to convey light around the windshield periphery.

It's obvious that these same principles could be utilized on plastic or for that matter, even on metal parts where the fiber would simply be glued onto the periphery of the part or be covered over only in part by the metal if desired.

It Should be noted again that the light eminating from the fiber can be infra red or any other wavelength that might be desirable for better deliniation of the surface. Indeed, the fiber in the case of plastic, can be buried such that it could not normally be seen under visible light but that infra red radiation, in this case eminating from the fiber outward through the glass or plastic could be seen.

Clearly, more than the four targets shown in FIG. 5A on a door can be used as can more zones than simply the periphery of the part of the windshield such as FIG. 6. However, these are the two principle examples, .namely four points is the sufficient solution including a redundant check of the 6 axis, photogrametric equations, and of course the periphery is the main item of interest when looking with stereo cameras.

Note that in FIG. 6, many fibers are lossy just by themselves if additional losses were required, for example when they were imbedded in a matrix, the fibers could be roughened for example.

Clearly, plastic pallets and carriers can also be so instrumented. Indeed, light conductive paths can even be built into the plastic of a carrier such as FIG. 4.

FIGS. 7A and 7B illustrate another method for targeting objects. In this embodiment of the invention, a cylinder head 500 is targeted, in this case on the rocker cover rail 501, with targets 502, 505, 506 and 507 on the four corners of the rail perimeter.

Target 502 in this case is formed by a single depression in the rail, for example, the conical surface made by a drill as it Just touches the metal. Such a conical surface reflects light at diverse angles from that of the flat machined face of the cover rail itself, and therefore makes an excellent contrast target when viewed at appropriate angles. For example, when light from source 510 carried on robot 512 hits the cover rail containing such conical target, light is directed back at camera 511 from the target because the face of the target is pointed more or less at the camera 511. However, the light from the cover rail is directed off at a angle away from the camera. Therefore, it appears bright against the background of the cover rail and against that of the cast surface of the part. In other cases, the rail surface would be bright and the conical surface dark. The fact it is a cone, means that approach from any direction in the plane of the rail face desirably produces similar results.

Shown in the top view for illustration, different sets of targets have been shown on each of the corners. However, it is considered likely that in any one case, one type of target would be used. For example, the target cluster 505 contains four such conical faces or for that matter, four targets of any sort such as will be shown in FIG. 8A for example. In this case, four targets of course are much more unusual than a single point and would be unmistakable relative to any sort of backgrounds since nothing else on the part could have such a cluster reflection. In this case, the center of the four dots gives the center of the target.

The same holds true of 506 which is a 3 pointed version, also providing a center. Cluster 507 having two points, while probably unmistakable, does not have a center point except in the one plane. In this case, therefore, the center of the dots themselves would have to provide the answer in one plane.

FIGS. 8A and 8C illustrate another target method, also applied in this case to cylinder heads but of course general to any sort of part. In this particular case, the part is cast where it is shown that on cylinder head casting 530, there are appendiges cast which do not interfere with either the assembly or the function of the part. These are shown as 531, 532, 533 and These appendiges are indeed targets and of course are unmistakable in any sort of view.

To make them more unmistakable, certain angles have been cast into their sides. Such as shown in the end view of 532, the particular angle of reflection transverse to the head axis is such that when overhead light from an overhead light field 535 is projected, that these facets shoot light off to a camera at a preferred angle. In this particular case, the opposite one 531, would have to be made in a different way as shown, such that it too had a facet in that direction. It is noted that the direction can be chosen such that no other features on the part have reflective angles in the same direction. In other words, for any part, no matter what it is, one should be able to find certain angles at which target data can be made to show up either brighter or darker than the rest of the part with no other, or at least a minimum of other part features having angles at these directions. This of course helps the discrimination in a passive manner.

Similarly, certain targets can be bevelled in more than one plane, such as 533 as shown such that when viewed from either of two angles, a brighter reflection is shown. (Conversely the lighting can be at an angle and the camera located overhead.)

Also shown in this drawing, are cast in target cones or crosses such as were applied in a separate drilling operation in the FIGS. 7A and 7B version above. These are shown as 540, 541, 542 and 543.

In this case, a male portion in the mold itself provides a suitable indentation in the part. Since the targets can be so cast, they can be of many other shapes besides simply conical surfaces, holes or other easily machined shapes. For example, cross shapes like the facets of a Phillips screw, which are undeniably discriminate as targets as opposed to other features on the object which can have some resemblence to conical shapes.

It should be noted as shown, that such shapes do not necessarily have to be indented in the part but can be raised such as the equivalent feature 545 shown sticking up. Such a knob or bump on the part, however, can be in the way of the function of the part and its handling if it is not properly positioned. It is therefore thought since many parts generally have flat surfaces, which are either functional or to simplify handling, that the best means is an indentation in those surfaces which does not interfere with either purpose.

As shown in 8B, a cast or drilled in cone, cross etc. in a surface 545 into the surface of material 546, can optionally have a transparent plastic filler material such as 550 placed into it to cover up a portion or all of the depression or even provide a raised portion sticking out from the surface of 546.

This plastic material can serve several purposes. One purpose is that it simply protects the surface of the depression from rust and deterioration. This could be quite important in let us say a bright shiny drilled portion on an aluminum or steel part which in time tarnishes or rusts.

A second purpose is that the filler itself makes a different optical element out of the mirror formed by the cone surface (cross etc.) and in this case forms it into a prism which can have use for either spreading the light or directionalizing it.

A third potential reason is that the plastic filler may itself be chosen so as to preferentially reflect light only of certain colors. This then allows another form of discrimination of the targets based on color.

The principal disadvantage of using such a filler is that a separate operation must be made to put the plastic in, which cannot normally be done easily on a machining line. One exception, however, is the process whereby first the reflective hole is drilled into the casting, then plastic is sprayed into the holes very simply, and then a final machining pass required for other purposes is done which in the process shaves the excess material away leaving the plastic flush with the hole surface. This obviously then only adds the spray guns to the process, FIG. 9 illustrates another example of targeting, this time on a plastic body panel 570 illuminated by light field 571 which is then directed by a target molded into the plastic surface 572 onto camera 575. As shown, the target is reflective and is composed of a diffraction grating which directs particular colors or, in general, light of all colors, at angles from the surface. An alternative is that the target 572 be composed of a multi layer interference elements preferably in plastic which also can direct light at preferential angles in preferential color combinations.

If the camera 575 is capable, as is a color TV camera, of color sensing as well as spot shape sensing, it can then differentiate these colors and unmistakably identify that such a color spread can come only from such a target. This can be done even in the presence of strong background, as from the surface of object 70. Such color combinations can also be coded into the targets to identify the part 570, its angle of orientation etc.

Rather than mold the plastic into the part, it can also be simply glued onto the surface of the part (578). If a thin reflector film, such as 578, it may, even though sticking up, be non-interfering with the function of the part. However, for plastic outer Body panels in cars, the flush target mounting such as 572 is preferred. These targets on painting of the car, become covered over. For example, if the targets are on the door panels of the car, which are mounted to the car at the time of painting, their presence is lost once the car is painted. The targets used for such mounting for example, should be flush and create no disturbance with the panel surface once they are painted.

It is also noted that targets can be built into objects however to actually be part of the object's appearance. The necessity of covering the target up depends greatly on the aesthetic characteristics of the object.

Another possibility is to utilize targets which are seen as targets only under special illumination which would not normally be present in a human situation. For example, consider target 572 which could be either molded into the panel or for that matter, simply a portion of the plastic surface of the panel itself treated with a special ultra violet florescent material. Only under ultra violet light would this target portion of the panel actually be visible relative to its surroundings.

This is partly true of the multi layer diffraction/interference case above where the line spacing of the diffraction pattern or the multi layer material and spacing could be chosen such that only under certain colors of illumination, and then perhaps only at certain angles, could the light be strongly seen relative to the surroundings. This then would be particularly easy to arrange if such wavelengths were in the UV or infra red just beyond human vision. The near-IR is an exellent region for sensing with present day solid state cameras for example.

It should be noted that such targets do not necessarily have to be molded in but could be evaporated onto the surface such that the raised amount of material is virtually negligible. Naturally, in crude applications, such applied targets such as 578 could simply be white crosses of plastic glued on. Clearly, this could be unobjectionable in the final product if in the final painting process there is a wash that simply removes the glue and target. One advantage of the fiber types shown in FIG. 5A, is that the fiber end can be extremely bright and flush to the part surface.

FIG. 10 illustrates another application of the invention, to tracking a carton such as 579 travelling on a 'car' or carrier conveyor such as 590. The carton has been randomly placed onto the carrier and it is desired using programmable robotic means to grab the carton and pull it off at a certain station.

To accomplish this, all sides of the carton have printed on target sets of which 580, 581 and 582 are visible in the drawing. These target sets can be of any usable description and remain with the carton always. The beauty of this is that they can be utilized for tracking in the manufacturing plant, and for robotic warehousing purposes and throughout the distribution chain, even for example in a supermarket provide robotic unpacking of the product and place the product on the shelves. Naturally the product packages within the carton, such as let us say egg cartons, or milk cartons, cans etc. can also be targeted for the same purposes since all those have printed on labels or the like.

While each face in this case is shown with four dot type targets, these could clearly be of any number or type. The carton also could be coded to indicate the goods within the carton. In the extreme case, this would require a UPC type codes (e.g. 591), and indeed a miniature UPC code itself could constituted one or more targets. However, it is considered that most of these would use much less complicated codes since there would normally be no need for such large amounts of information.

It may well be necessary to code the object or targets since all different boxes would have different target spacings due to their own shape and one would first wish to decode which type it was so that the spacing of the targets could be known to the computer of the robot mechanism and fed into the calculations for the various solution of the photogrammetric equations.

For example, it could well be that a special code target might also be used such as 591 which would include all the photogrammetric solution data for that carton plus an indication of what was inside if desired. The robot camera system could read the code first and from same determine the various target location data on each of the faces of the carton including the target shape and size, the target spacing, how many targets there were and for example the shape of the product itself, whether in a square carton or what have you.

FIG. 11

Figure 11:
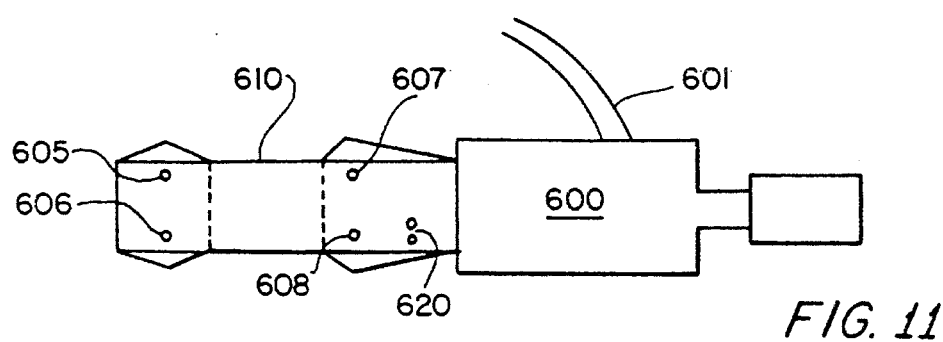
FIG. 11 illustrates means for targeting a tool.

FIG. 11 illustrates a similar concept this time using targeted tools such as the grinder 600 driven pneumatically via air hose 601. It is desired that a robot with a gripper come pick this grinder up and do work on an object, for example the leaded-in zones of a car body at the panel junctions.

For this purpose, the tool gripping area 610 itself is targeted, in this case using light emitting diode targets 605, 606, 607 and 608, also fed through the embilical 601. These diodes can either be on continuously, may be flashed to provide has high signal to noise, or rippled such that only one is on at any given time. The latter is useful if photo sensors responsive only to one point at a time are used such as continuous spot detectors (e.g. UDT SC-10).

Naturally, rather than light emitting diodes at the tool, fibers can be utilized to feed this data to the same points from one or more remote light sources.

The robot hand with camera would approach this tool and via the targets grab the tool at the desired location, in this case, the cylindrical surface 610 which would be grabbed by 'V' shaped grippers. It is noted that the targets can be placed specifically so they bracket this area and this is a preferred mode of target placement in such instances. However, this is not necessarily required. The targets could be placed such that gripping would be known to the computer to occur in any other location as well.

In this case, it may also be desirable to have a code such as 620 shown. This code could carry with it the data of where the part is to be gripped, whether it's between the targets or somewhere else, and again, what tool it was and perhaps other data as well.

It is noted that a target such as 532 and 531 of FIGS. 8A and 8C, if they project from the object in one or more planes, can allow more accurate solutions of the various pitch and yaw data which are derived from the projected spacing of such targets viewed by the camera. However, the more the target projects from the part in question however, the more the possibility it is objectionable for handling or aesthetic reasons.

FIG. 12

Figure 12:
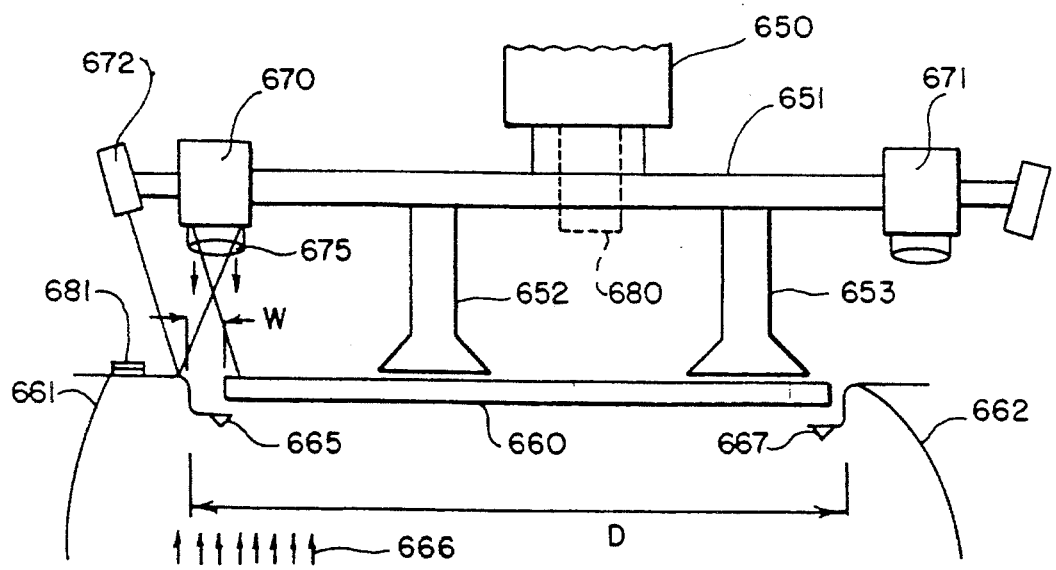
FIG. 12 illustrates alternative means for creating suitable targets, and use on car body assembly.

FIG. 12 illustrates another application of the invention to the assembly of car bodies. In this case, it is desired to assemble a deck lid 660 onto the body opening formed by two fenders 661 and 662 and the other portions of the body not shown for clarity. This problem is very similar to that of fitting the doors in a door opening or the hood in the hood opening and is optimally improved using optical sensing as disclosed.

As shown, a robot arm 650 carries-with it a tooling fixture 651 containing vacuum cup fixture 652 and 653 which attach to the deck lid 660 to be put on. The fixture itself contains optical sensors, in this case 670 and 671 which are used in the mode shown here tracking targets as well as to measure certain variables of the part itself using concepts shown in the referenced applications.

Such applicable sensors are shown in references 2, 12 and others.

As the robot approaches the car body containing the fenders carrying with it the deck lid 660, sensors 670 and 671, which contain linear or matrix camera units, have determined the position of the deck lid relative to the cameras themselves. In other words, the cups 652 and 653 can pick up this deck lid in a relatively random fashion from let us say a roller conveyor and have the cameras compensate the robot for this random position by sensing the edges of the deck lid. Alternatively, the sensors can sense the deck lid edges ideally and cause the pickup to be made in the correction location. It is likely too that other cameras would be located on the other sides of the part, for example, as shown as 680 (dotted lines).

When the robot is relatively far away from the body, the camera unit which also contains for example illumination source 675, picks up the reflected image of a stamped in cone targets such as 665 into the fender. Alternatively, for even better contrast, a hole 665 can be provided, back illuminated if possible by a light source such as 666. Unfortunately, however, in most portions of panels, extraneous holes are not desired. Such stamped in targets are however extremely possible and can be accomplished just as in the case of the cast in targets of FIGS. 8A and 8C in an analogous manner. The fiber based targeting systems are ideal if they can be employed economically.

As the sensing of targets such as 665, and 667 on the opposite side, as well as other targets around the rest of the periphery of the deck opening, allow the robot system to home in on the body. Note that unlike previous embodiments, it is not a single camera which is seeing all targets, but the ensemble of two or more cameras whose combined target data gives the position and orientation to the part. As the camera sensor unit comes in for its final approach, an oblique light projector unit such as 672 illuminates the portion of the part itself from which a triangulation data as to the exact range to the fender 661 can be provided at a higher resolution. Such a sensor unit incorporating this has been shown in reference 2 and other references.

As the part then fits into the opening 'D', the gap width 'W' on each side is sensed by each of the cameras on the four sides and optimized for the car body in question. When the deck is optimally positioned, then various hinge screws and bolts are run down to lock it into place. This process therefore not only generates a fully automated deck (or door) placement, but also creates a optimal body fit for highest quality performance. This operation does not necessarily require the use of the targets and can be done in a targetless fashion particularly if the body is stopped when this is occuring. If the body is however in motion, the target data definitely is very much desirable such that its side to side and forward/backward oscillations can be tracked on the approach.

It may also be required that two sets of camera magnifications be used, one at high magnification to determine the distance 'w' and one at lower magnification to track the targets. This depends on the application and naturally is not as desirable as just a single unit. Further, in this case the targets are shown being covered up by the panel, in other words, they are out of sight in terms of the body itself. This can be true in both doors, decks and so on. Some of the tracking however could be done by targets which were visible on other portions of the body and not covered. This would allow the targets to be tracked even at the time of actual panel insertion and bolting which would be desirable on moving parts. For this purpose, it is thought special targets should be stuck onto the body such as target 681 shown which has been stuck onto the fender and is, for example, comprised by a white background with a cross on it. Such targets might be viewed by a completely separate camera system mounted to the side or overhead or on the robot arm 650 itself rather than on the tooling.

It should be noted that in any of the above embodiments, targets should be as distinct as possible. If possible, certain types of reflective target material such as plastic retro reflectors and retro reflective tapes can be of extreme interest as long as they can be placed on the object in a manner that does not ruin its function. Such tapes and targets, therefore, are best suited for use on objects which do not have an aesthetic purpose and some of these would certainly be all conveyor parts, cartons etc. The problem, however, with these targets is that they are generally of materials which must be attached and this can cause difficulties in terms of both the cost of attaching the targets in an accurate manner (remembering that for best operation, with multi target systems, the target spacing and orientation needs to be known, such that the photogrammetric calculations can be accurately solved. The second problem with these materials is that they are often plastic and in some cases, plastic will not survive the remainder of the process whether it be hot washes, heat treat, or what have you.

It should also be noted that targets, when applied can be removed for use on subsequent parts. For example, retro reflective glass targets of very high contrast can be screwed into tapped holes on the part at very well known locations and screwed off later on and used again. This would be easily accomplished for example, on the cylinder head of FIGS. 7A and 7B if the tapped rocker cover rail holes for the rocker cover were utilized to carry the targets which were screwed into those holes, preferably automatically. At the final rocker cover installation, these screws would be taken out and the rocker cover bolts put in. Naturally, however, this adds two operations, screwing in, and screwing out, to the process but it does utilize the same holes that are put into the part anyway. Other targets could be attached with glues etc. which could be taken off the part with solvent and off the target such that it could be reused again after cleaning. This is discussed relative to FIG. 13.

In addition to the above ideas, there are several other continuations from the previous application that should be noticed. For example, FIG. 8 of Ser. No. 200,401 discloses instrumented grippers with fiber optic sensor units including a triangulation projection source to which allows 3 axes of data to be obtained. It is noted herein that up to 5 axes of such data can be obtained using projection of multiple beams or four beams to get four or five axes of data. This allows the pitch and the yaw of the part to be obtained as well as the range, plus the xy image and is further described relative to FIG. 15 below.

It is noted that the robot arm may be instrumented for guidance with such a sensor either using LED or diode lasers as targets or via fibers. Such concepts of guiding robots with external cameras using targeted arms has been shown in the copending application of reference 13.

Color discrimination of the various targets can be made by using color TV cameras or with simply a color sensor in front of a detector if applicable. For example, relative to background levels, if all targets are infra red emitting such as infra red LEDs, then an infra red, band pass filter can be placed in front of the camera such that greatly discriminates against the white light image background and shows primarily the infra red targets superposed thereon.

Furthermore, the holes put onto cylinder head in FIGS. 7A and 7B can be more than just conical, they can be actually be drilled in deeper such that they tend to absorb all light. In this case, one would look at the angle of reflection from the bright machined face of the rocker cover rail and the target holes would show dark.

It should be noted in FIG. 8B, a blob of plastic or a blob of silicone could be put on top of the part to act as a target. Indeed, if a linear strip of silicone for example were utilized, this would approximate the fiber arrangements shown in FIGS. 5A or 6 and indeed light can be transmitted through and around the part illuminating edges of it thereby.

FIG. 13

FIG. 13 illustrates one example of a reusable target, in this case, a special screw 700 which is screwed into a threaded hole 701 in a part 702 such as the cylinder head of FIG. 8, engine block, or for that matter just about any machined part that has a threaded hole. These threaded holes would as has been pointed out, be almost certainly holes that already exist on the part for other purposes and as for assembly with the target part taking the place of the regular part up until the point of final assembly when it would be removed.

The target screw is built like a socketed cap screw but instead of the socket hole, in this case, being at least partly filled with a retroreflective target 705, which is ideally comprised of plastic or glass retroreflective material for example that commonly used on automotive reflectors or specialized types built by 3M and other companies.

If desired, a color filter such as 710 can be utilized on top of this screw or as part of the retroreflector to give a preferential color signal from this particular bolt or stud if it is desired to distinguish it against others. The reflector design itself may also provide such distinction being multipointed or what have you.

This particular arrangement provides an extremely high target deliniation, and allows the targets to stand outward from the part surface if desired (as for better photogrametric solution purposes) by simply having a long threaded length. Furthermore, this stud is a relatively low cost item and can use automatic lines to put in and take out. The only disadvantage of course is that it must go into a hole that is later used which means in the final assembly process, the target cannot be used unless the part is not moved during assembly after the target is taken out.

While a screw type has been shown, it is clear that other arrangements such as bayonet, snap in/snap out, or other targets could be utilized which could be removed with special tools from otherwise clear holes which later would accept trim strips, rivets or what have you.

In other cases, the target itself might simply have a pointed end such as a pin which could be stuck into the object material and later removed leaving a hole which would cover itself over if the material was relatively compliant. This could include, for example, seat materials or meat on overhead conveyor lines where the carcass itself could have targets put in it.

FIG. 14

FIG. 14 illustrates an application of the invention to working on a continuously moving car body assembly 780. In this case, a robotic system according to the invention is provided complete with camera system 785 which locks onto the body targeted with reflective targets 781–784 in the working region causing the robot to track the motion of the car body side to side, backward and forward on the body "truck" (not shown).

The sensor unit 785, in conjunction with robot control computer 789, controls the robot arm 800 to move an abrasive belt grinder 801 to grind out the lead 790 fill-in between the sail panel 791 and the roof panel 792. There are two forms of additional optical sensor units of use in this embodiment. The first is 805, such as FIG. 16 of the referenced application which allows the attitude of the belt grinder to the surface of the body to be determined for tracking purposes. The second (not shown) is a contouring sensor such as FIG. 4F of Ref. 12 which contours the leaded zone of the body to feed back contour coordinates to the grinder and update the amount of metal left on and judge whether or not further grinding should occur and if so, from what angle (determined in conjunction with the dynamic tracking data at low resolution from the target sensor 785, and at high resolution from the on-board sensor 805).

Utilizing all three of the optical separate sensor systems plus force feedback, a complete grinding cell so to speak can operable on-the-fly. If the car can be stopped in its motion, the target based system is not as much required for tracking the gross motions of the body and the other two sensor systems are sufficient. However, the target system is a good "insurance" for rapid approach.

In the above application, considerable amounts of specialized hardware are of use, much of which has been discussed in the referenced applications. For example, camera units are best provided by solid state matrix arrays such as the GE TN2500 and the new solid state TV color arrays now appearing on the market by Sony and others.

In terms of light sources, flashed Xenon light sources are very good for illuminating targets with brilliant high signal to noise pulses, even when color filters are applied. Also, such flashes do not cause the solid state cameras to bloom, a desirable advantage.

Desirable laser light sources include diode lasers operating in the infra red made by RCA and Laser Diode Laboratories. Of interest too is the Mitsubishi 4001 laser diode which is partially visible.

The high powered infra-red LEDs such as the Texas Instrument types can also be utilized for such illumination through fibers or what have you. LEDs are very convenient in that they are low power consumption and can be modulated as can the current range of diode lasers.

The approach described relative to FIGS. 5A and 6 holds for all kinds of other parts such as tires, parts of aircraft, furniture, just about any part where some sort of method of casting, molding or otherwise placing fibers into the part can be done. Even metal parts can have integral fibers if they can stand the melting temperature (e.g. quartz fibers).

It should also be noted that the part does not necessarily have to have fibers cast or molded in. One can also have a fiber placed onto this part, for example, glued to the part around its periphery or at specific points. These are then illuminated and can then be used for the same robotic and other purposes as shown above.

This gluing operation, however, generally requires additional labor, either human or robotic, although it could be done on an automatic in-line machine as well.

It should be noted that while fiber optics have been discussed as the light carrying medium, it is clear that a transparent silicone bead laid down on a part is also light transmitting although less so. This particular use of fibers and other light transmitting mediums applied into or onto parts is particularly appealing for many applications where they are to be substantially robotically handled and, therefore, where the cost of applying the fibers in and illuminating them at different stations is made up by savings due to reduced complexity of robotic automation utilized.

The application of such concepts to things such as tooling was discussed in my recent copending application (ref 2) on robotic casting inspection, where sensors were in the tools to sense part condition. This disclosure has expanded on this to provide fiber illumination of tool location to allow handling or size determination of tools. This is also related to a copending application entitled "Method and Apparatus for Detecting Wear or Breakage in Tools". Suffice it to say that tools can also be illuminated like the J-hook of FIG. 1, to provide meaningful indicators or targets to allow pick up by robots or other automation. One can consider such tools as cutting tools, small drills, routers, pneumatic wrenches, saws, lasers, weld heads etc. All can be instrumented in this manner. Even small things such as sockets for wrenches can be so instrumented.

Note that 'light' in this application refers to all wavelengths of electro-magnetic radiation IR through UV.

Similar fiber optic emitter targets can be the grippers or arm robots themselves, replacing LEDs or other types on the grippers such as shown in copending application entitled "Electro-Optical System for Control of Robots, Manipulator Arms and Coordinate Measurement Machines".

Suitable fibers include, at the low end of cost, the Dupont Corfon plastic fibers as well as glass fibers made by American Optical, Corning and numerous other manufacturers.

It should be noted that image transmissive bundles can be utilized to remote the images of sensors shown in this application as has been shown in the referenced copending application which this application is a continuation in part. Such fiber optic bundles are made by Nippon Sheet Glass, Olympus and others and can have very high resolution.

It is noted that image scanning photo detector camera arrays and sol it state TV (matrix array) cameras, while preferred, are not the only means of viewing the targets of this invention. Other TV cameras can be used, as can in some incidences scanning laser beams or even fixed detectors optimized for a preferred target signature. Continuous or quadrant position detectors (such as UDT SC-10's) can be used as well to determine the image position of a single spot or target at a time.

Figures 15, 17:
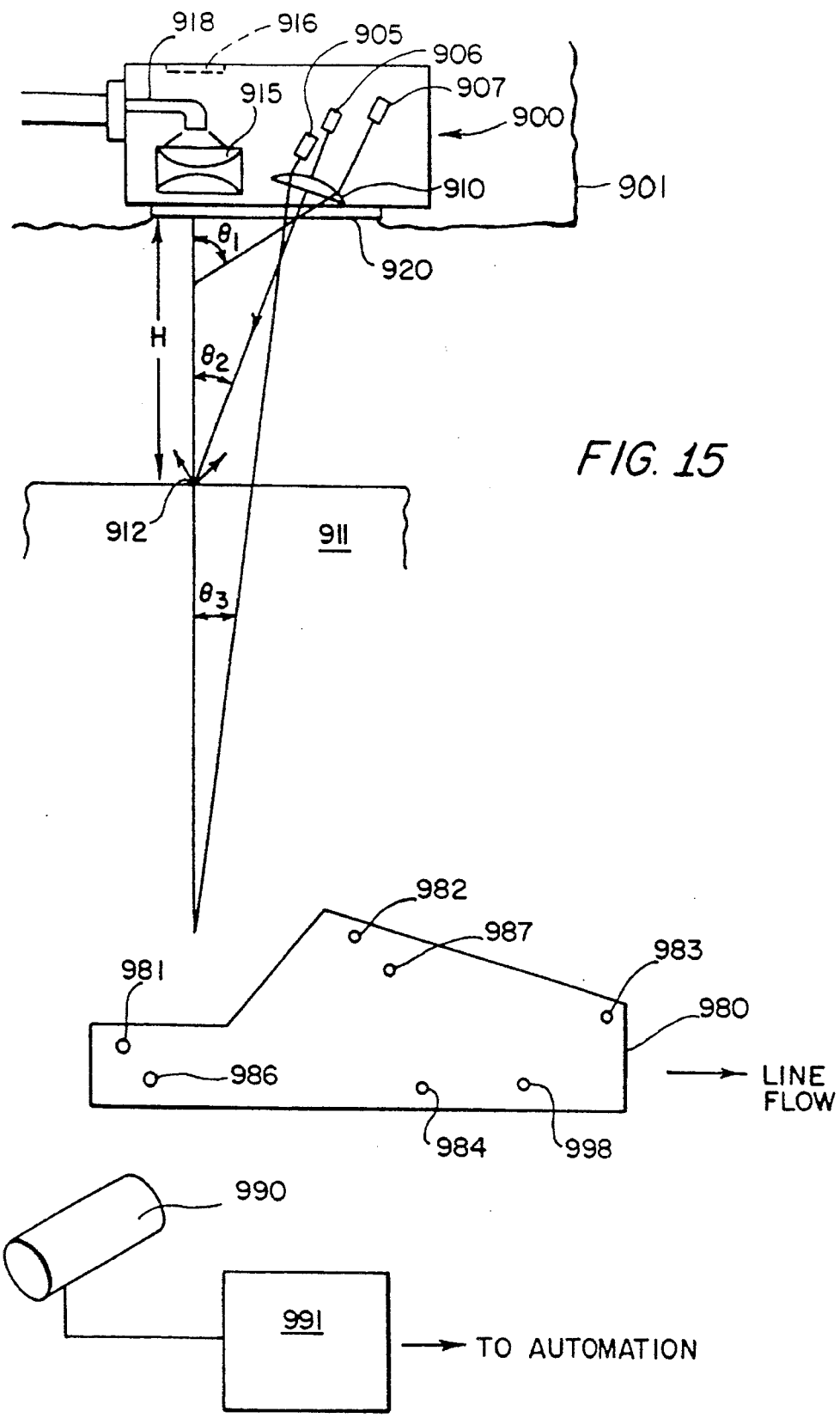
FIG. 15 illustrates a sensor embodiment according to the invention.
FIGS. 16 and 17 illustrate further part targeting embodiments.

Shown in FIG. 15 is a sensor according to the invention providing an improvement on some of the fiber optically based sensors of the co-pending application Ser. No. 200, 401. This particular sensor shown is a multi range sensor of unique small size according to the invention which in this case is shown being so small that it can be built into the grippers of robots. It does not require targeted objects, but can be combined with other embodiments to work in conjunction with targets as well.

As shown sensor 900, located in this case in one half of the gripper portion 901 of a robot end effector is comprised of light sources 905, 906 and 907. (In this example there are 3 light sources although there could be any number.) These light sources are diode lasers or in many desirable instances, they are 0.005 optical fibers remotely connected to diode lasers with only the fibers brought to the sensor.

In any case, light from each of the fibers is focussed by single lens 910. However, due to the variation of positioning of the fibers, the light is focussed at different distances and at different angles depending on the position of the fiber. This is ideal for providing a multi range, multi resolution sensor, with highest included angle and resolution at the shortest ranges as is desired for accurate part pick-up and other purposes.

Light source 906 is focussed at the nominal range to the part 911 shown in the drawing forming a reflected spot 912. This spot is, as has been described in many copending applications, imaged by lens 915 onto an integral photo detector array 916 (dotted lines). However, in this case, again for compactness, the image is formed onto a coherent fiber optic bundle 918 and carried to a remoted matrix photo diode array. Thus, in this example, all light sources and sensing can be done over fibers if desired. This is attractive for thermal and electrical isolation purposes, plus light weight on small robots.

A suitable window, 920 is provided in front of the sensor housing.

The other two light sources, 905 and 907, on either side of the nominal, focus at different distances and at different angles. The larger the included angle θ, the more the resolution. Therefore, it can be seen as the image forming capability associated with 907 is at the highest resolution with the part closest and this is used for the fine approach of the sensor where the range 'H' might be only half an inch. In the case of 905, 'H' might be set up for 10 inches.

Obviously, this sort of an arrangement is fine for maintaining a reasonable focus of light sources at different ranges. However, with a single lens 915 one needs a narrow aperture to give large depth of field and maintain the spots projected in reasonable focus over a wide range of object locations. Alternatively, a zoom lens 915 can be used to maintain focus over the range.

Since spot centroids are being measured, it is noted the spot image can be somewhat out of focus and still be utilized (see reference 2 or 4 for suitable circuit processing). Optional white light sources can also be used with this arrangement to provide a edge image lighting with the part 911.

It is further noted relative to FIG. 15 that each diode laser or fiber could be focused by an individual lens. While more complicated, this allows more angular spread between beams. It is contemplated that only one beam would be turned on at once, suitable for the range in question. However, even if more than one were on simultaneously only one is generally in the field of view of lens 910 at a time. If there are two in the field, they can be discerned from their location. Indeed, two divergent beams can be projected on purpose at once in the field, one to determine range and the other to give angular orientation from the beam separation on the target, knowing range.

It is further noted that this invention is very useful to control robotically positioned non-contact processes such as laser welding, drilling etc. especially on continuous lines. In terms of processes in general, the invention applies to welding, drilling, grinding, cutting, hardening, and any other material removal, addition on transformation process.

The characteristics of targets used in this invention generally include distinctive shape, light reflection, light transmission or light emission characteristics relative to the normal surface of the object targeted. Where the 'normal' object has targets, a better definition is relative to the rest of the object surface, ie the untargeted remaining portion. Light emission, reflection or transmission can be distinctive in color, direction, distribution of direction or color, shape, and intensity.

In the case of the fiber version and other active targets, the targets can also be diverse in their light modulation frequency.

It is noted in the application of the invention to practical plant problems, that photodetector arrays are much prefered over the analog tube based TV cameras used by Pinkney and other photogrammatists. Particularly photodiode arrays such as the GE TV2500 do not require frequent calibration and therefore can be relied on much more to give accurate dimensional data as to target or spot location. For example, a TV tube drift of 3% in the apparatus of Pinkney et al can create a generally intolerable error of 0.3" at 10" standoff in the range data alone. The arrays used in this invention preclude this possibility.

It is further noted that in the embodiments shown herein relative to continuous conveyors, if conveyor speed is known, the tracking requirements are reduced accordingly.

It is also noted that the snubber rails 250 and 251 are but one example of means to constrain motion or velocity in one or more axes of an object in this invention. It may also be useful to constrain velocity for example using electro magnetic or viscous fluid damping. Constraints of this sort generally make the total robotic handling or parts working system easier to control.

This disclosure has described many ways of adding targets to objects. Other ways of making the target part of the object have also been described. Where the object is one which is in it final form and located in a position that it can be seen by a consumer who expects it to provide a pleasing appearance, there is considerable requirement to make the targets used in the invention either essentially invisible or alternatively make them have asthetic value of their own.

For example, a doped target zone of a plastic dashboard piece can fluoresce under UV light but remain invisible in normal illumination.

Alternatively, a portion of the object may contain a special dopant to cause it to reflect or absorb in the IR more than normal.

A desirable condition exists if one can make the targets part of the overall design to provide for example a pleasing accent feature which are viewed as part of the design. Where possible the targets can also be functional features such as holes, knobs etc.

For multi-target application involving 3, 4, or more targets (to provide maximum solution capability of the photogrammetric equations) it is noted that the targets do not have to be equi distant or otherwise or rigidly arrayed in their relation. Thus a variety of asthetic possibilities exist. For example:

On rectangular parts, the 4 corners are desirable where targets can be squares, circles or other shapes.

On circular parts or sections thereof, the 4 targets 90° are desirable or 3 targets 120°.

On irregular parts, the targets can be in any logical arrangement.

Figure 16A:
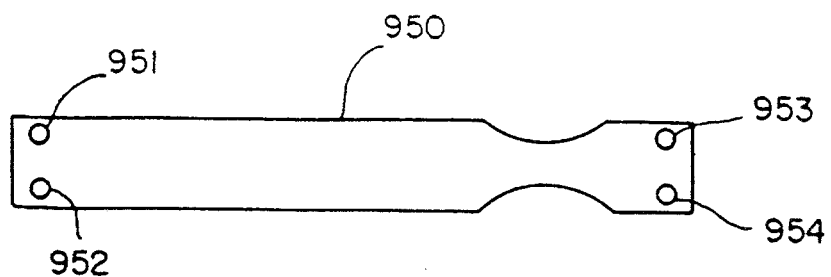
Figure 16B:
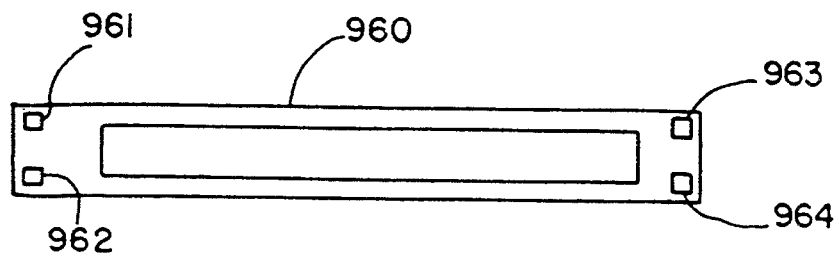
Figure 16C:
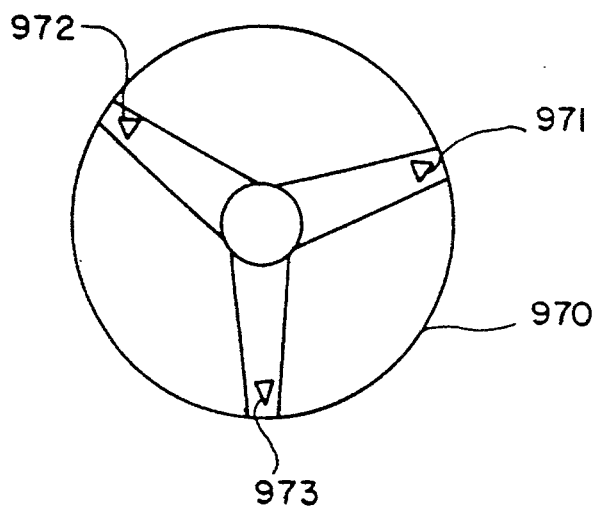

Examples are:

a furniture leg 950 with round head tacks 951–955 at corners serving as targets (FIG. 16A)

automobile grills 960 with decorative square target fascets 961–965 or slots near the corners (FIG. 16B)

automobile steering wheels 970 with triangular bright inserts 971–973 in outer edge of three 120° spokes (FIG. 16C)

It is also noted that within the target slots 241 etc. of FIG. 4, transmissive diffraction gratings and other preferential diffusers of transmitted light can be located.

It is further noted that light from the fiber end 20 for example need not necessarily be imaged by lens 40, but can be detected directly by one or more detectors.

It is noted that in many plant applications where the targeted object goes through many processes or are repetitively used (e.g. the conveyor carriers of FIG. 3), that the targets can degrade or be knocked off, destroyed etc. Thus it is desirable in many cases to have a superfluous number of targets.

Since only three targets are needed for a complete photogrammetric 6 axis solution (and even two will do if certain aforementioned constraints are used), 2–3 is then the base number of targets per object generally desirable. In many cases, a fourth target is desirable to provide a redundant solution however.

This invention therefore considers the purposeful addition of extra targets also in known locations relative to the 2–4 basic targets and for the additional step of determining which targets are present and using an optimal solution for those.

Consider FIG. 17. Illustrated is a conveyor pallet 980 used repeatedly in a plant equipped with targets 981–984 and extra redundant targets 986–988. In one mode of operation, normally camera 990 and computer 991 are programmed top consider only targets 981–985. If, however, one of these targets is missing, the images of target 986, 987 or 988 is utilized. In general the rationale is to use the remaining target closest to the missing one but the best rationale is to use whatever target combination gives the best solution (ie. most accurate) of the photogrammetric equations.

It is contemplated that certain additional targets might also be applied to provide, in certain instances, more accurate solutions for example, to pitch or yaw variables in the plane perpendicular to the lens axis. For example, one might choose at certain stations in the line where a higher degree of sensing in one or two of the variables were desired, to use target 988 on purpose, instead of 985 say.

Naturally, if all targets but 3 are damaged, one uses the remaining 3 regardless. However, the .invention can include the additional step of signaling a control that pallet Ser. No. 1368 say is down to its last 4 targets and should be repaired.

It is further noted that a system input or verification station is often desirable in a system such as shown in FIG. 3.

For example, consider providing sensor 262 at a position where the conveyor carrier is well positioned such that the targets can be checked for presence and their locations verified if desired. Not only is this helpful in keeping the system in control, but if each carrier was serialized or sequenced the actual target location can be measured at this station and the locations stored in a computer, such as 280, relative to the carrier in question. This allows different carriers of different parts in different states of repair to be intermixed on the same line with no loss of target position accuracy. This is important since the accuracy of the solution of photogrammetric equations (used to guide the robots on the line such as at the station of FIG. 3) is based on the degree of accuracy with which the relative location of the targets to themselves and to the carrier body is known.

Only one such verification station (which could also have a carrier serial code reader as could the station of FIG. 3) is required per line. It also, as has been mentioned, helps monitor damaged carriers and damaged carriers could then be automatically routed off-line for repair.

Note that verification station can also be used for parts when they are in a fixtured or otherwise known correct position at some point in a line. Any missing targets as well as locations can be verified before they enter the system.

This invention will be useful in a wide range of applications and it is envisioned that a standard sensor computer unit can be built essentially independent of the application. The user would only need type in or otherwise enter data into the computer such as 280, to tell the system the pertinent target location and spacings on the parts or objects to be handled, assembled, or worked. Thus it can be reprogrammed to different parts, lines etc. and forms the basis of a generalized robot control system.

Figure 18:
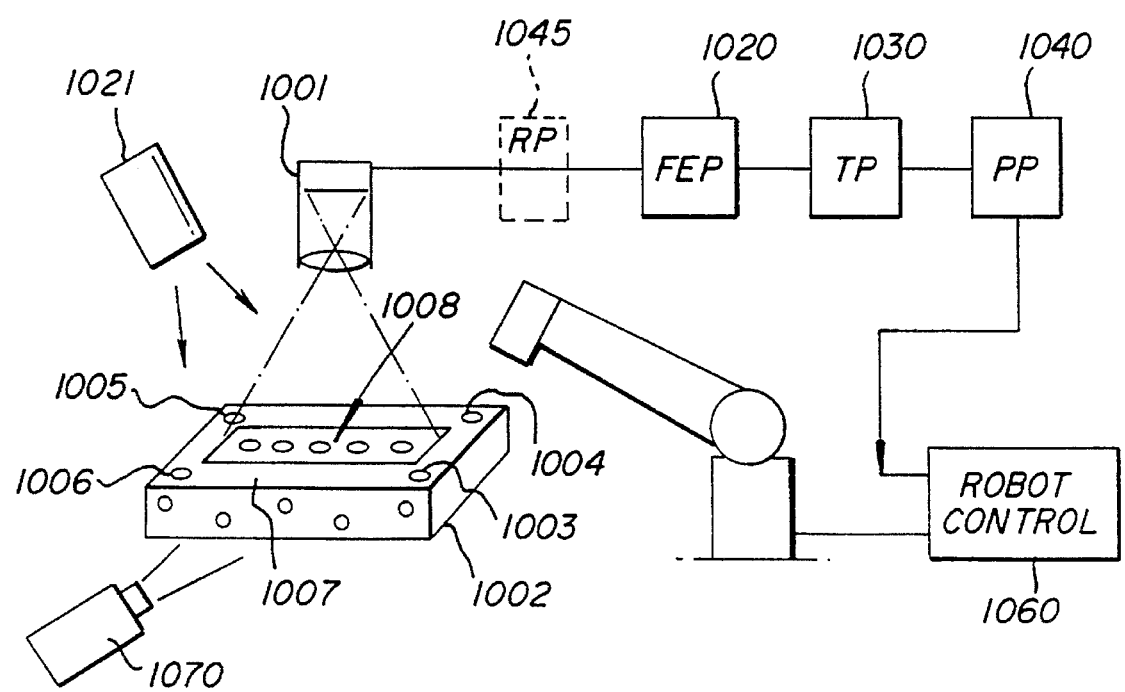
FIG. 18 illustrates an embodiment of the invention used to acquire and track rocker cover rail holes on a cylinder head.

With reference to the use of naturally occurring targets, what then does it take to make this sytem work? Clearly, the first item, FIG. 18 in the drawing, is a camera unit 1001, typically a solid state TV or matrix array camera such as a GE TN2500. This camera unit scans the image of the part which in this case is, let us say, a cylinder head 1002, with rocker holes 1003, 1004, 1005 and 1006, in the rocker cover rail 1007 together with numerous other holes in the middle of the head such as group 1008.

The camera 1001 is connected in this case to a front end processor, or "FEP", 1020, which is used to do a very specific processing operation on the generalized image of the part illuminated, for example, in reflection using a light source 1021 and determine from it the position of all holes of a diameter equal to the approximate diameter of chosen target holes, in this case, the rocker stud holes. Alternatively, the front end processor can also find the location of all holes which are situated at the corners of the part—often a good choice for target location and of course useful when corners are used as targets.

The location of the holes is made particularly easy since once one finds one hole, one generally can find the other three simply because one knows approximately from the part geometry that it is an approximate spacing from the first hole found. This processing, that is looking for hole signatures of a particular type and location, is much easier than generalized image processing of reflective part images. This is a crutial point.

Once the target holes have been found by the front end processor, data as to target hole location coordinates are fed to the (optional) tracking processor "TP", 1030. The tracking processor's sole function then is to lock the sensor unit onto those holes as found and keep them locked on. At this stage, the front end processor need not make any other particular judgements. Its function is now removed by the tracking processor. The TP is not required unless the object is in motion relative to the camera.

The turning over the control to the tracking processor clearly allows a much more higher speed operation to occur. For example, in acquiring the target holes, it could well be that for poor lighting conditions, complex parts, dirty parts, cases where some targets were obscured, etc. that the front end processor could even take as much as one second to make its analysis. Obviously, this is much less than the desired 15 Hz minimum update rate of the camera and still less than the desirable 30 to 60 Hz operational rate of the tracking data. However, once the holes are located, the tracking processor 1030 can keep them locked on easily.

Since the part itself may be in motion relative to a camera located on a robot over a considerable duration of time and space while the robot does its various operations on the part such as assembles to it, works on it or handles it, clearly the one second lost to determine target location at the beginning is minimal as long as high rate 15–30 Hz updates of coordinate position can be obtained thereafter.

From the targets (and tracking) processor, the locked-on target data goes to the photogrammetric processor "PP", 1040, which then solves the photogrammetric equations using the targets in the manner described in the Pinckney application and technical papers and from this determining the general object location in up to six degrees of freedom relative to the camera. Clearly, different solutions are utilized depending on which targets the FEP and TP processors have been able to acquire and lock onto. In other words, a normal equation set is utilized for the four rocker cover rail holes. But special equation sets covering the use of lets say three holes only or three rocker cover rail holes and a rocker stud hole or some other combination that might be necessary in certain instances are stored in reserve and utilized if required. Corners and other non-hole features can also be used in this context as well.

Again, the reason that we can do this is that we know apriori what that particular parts dimensions are. It can be obtained for example directly from the part prints and even down loaded into this system via from a CAD data base. This is of course a truly simplifying situation suitable to modern manufacturing. Obviously, different target data sets can be used for different parts and the first step of the FEP could be to actually identify the part as to which one is present and then go through the acquiring of the target data representing that part. Indeed, the hole layout on the part likely tells which part it is. Of the particular family of parts for example that can come by the robot station, one could identify them first from the hole location data and then utilize that to lock onto the particular target set called for by the equation for that part. In other words, one can optionally incorporate recognition processor "RP",1045, which first recognizes the part.

Note too that the optional CAD system so that can optionally be utilized to input data to the FEP and RP and PP processors. This CAD system can also specify any special targets which might be used in the part such as retro reflective tape, paint spots or otherwise (see below).

Another use of the FEP is to identify special part features put on the part specifically as targets. This includes cast in reticle, machined in notches or identifications, raised or indented material in stampings, plastic etc. When illuminated with ordinary light, the contrast of these features is often low relative to part as a whole and a special processor is thus required to pick out the target 'signature'.

Naturally once the photogrammetric processor 1040 has determined its data, it feeds the data to the robot control 1060 which then controls the robot to make its relative moves relative to the part. This position data is up to 6 axis (x, y, z, roll, pitch, yaw) as has been previously described and included in the output data stream is rate of change data that can also be determined from the successive frames. For example, with flashed light sources 1021 and matrix arrays for camera 1001, (like the TN2500) very accurate velocity data can be obtained since the flashes can be precisely timed to let us say to one 30th of a second apart with 10 microseconds accuracy.

It goes without saying that other cameras viewing other sides of the cylinder head, 1002, such as auxilliary camera 1070 in FIG. 18, can be used as in FIG. 18 to look at the holes located on say the bottom side in the drawing (which would be one of the intake manifold faces) and utilize those holes for positioning from another angle. If so desired, this can be in conjunction or-in place of the camera, 1001. Separate processors RP, FEP and TP would be required. However, the photogrammetric equations could be solved by perhaps the same computer PP and fed to the control if indeed it was the same robot control. It could of course be another robot coming in from the other side to do other operations or to remove the part or what have you.

FIG. 19

Figure 19:
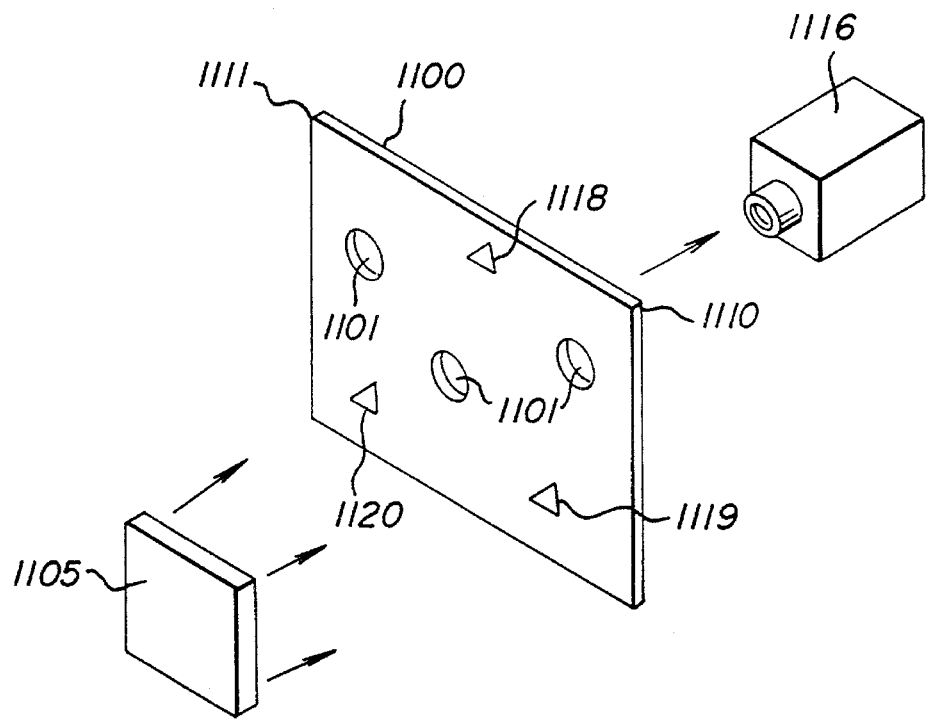
FIG. 19 illustrates an embodiment of the invention using backlighting of sheet metal panel holes and corners and special triangle holes.

For illustration purposes, a formed sheet metal panel, 1100, with certain holes 1101 in it, in FIG. 19 can also be shown in which case it is backlighted by light source 1105 and viewed by camera 1116 in a functionally equivalent manner to the system above. Naturally different panels and different locations can be so obtained. In this case too is illustrated the use of corners 1110 and 1111 as well.

Also illustrated is the punching into panel 1100 of triangular shaped targets such as 1118, 1119 and 1120 as shown. These targets are often viewed in reflection since the inner panel 1100 is often welded at the time one wishes to look at it onto an outer panel (not shown).

The basic processing ideas shown above naturally would work with other kinds of targets such as painted on dots and the like. The idea of a recognition processor and front end processor are there only where required. If the targets however are so obviously visible that no recognition or front end processors are required, then clearly the target data can be immediately locked onto by the tracking processor TP. This is the case when very high contrast targets are used as in the Pinckney et al invention described in this case where the target dots simply appear at a threshold over the background.

However, such a simple case (Pinckney) cannot be utilized when the holes indeed are black or where other black occuring objects including freespace are located around the part. Clearly, in that case, it is necessary to recognize the edges of the holes or the centroid of the hole if possible and from that determine the target location.

Various types of front end processors occur in the image processing art. Many utilze boundary conductivity and other algorithms to draw boundaries around parts, contrast enhancement techniques and other things to make the holes or other more visible features. It is not the intended here to re-invent these types of processors. It will be noted, however, that an excellent one for this type of data actually exists in the recent patents by the inventor and his co-workers on automatic flaw detection systems in which case can operate efficiently with reflected light and clearly serve to identify the holes as "flaws" in the present of variable light fields, dirty sensor windows and the like. It is therefore clear that the pre-processors such as described in the flaws case can be utilized to scan these reflected part images to determine the hole-like features of the object from which further identification processors in the FEP item 1020 can be made in order to determine which item of the many holes located is to be considered a target.

A commercially available processor which can be used in some cases is the Machine Intelligence VS 100 processor derived from the work at SRI which has been published widely. A better choice is the Analog Devices IVS-1000 or the Hitachi HIDIC-IP.

Actually, therefore, the FEP itself can often be considered to have two parts besides any recognition function RP, ie, first the processor to find the individual black appearing objects in the often very confusing field caused by the glints in light and dark features, dirt etc. on the part such as a cylinder head engine block, water pump or the like and, second, having once found these holes a second processing step to pick out which ones are to be required from their location, size, and possibly shape.

It is noted that sometimes the finding of holes can be considered to be quite difficult. For example, small blind holes in plastic instrument panels exist only in the webbing of the plastic at certain junctures and are rather dull in contrast compared to dark plastic instrument panels. This may require high intensity lighting and a particularly sophisticated form of image processing which tracks around the various path type features of the panel until finding the relative bulges where the blind holes occur. This is not necessarily the only way but it is just meant to illustrate that the processing for these "hole signatures" may have to be relatively sophisticated.

The beauty of the invention is that, whatever the processor is, it can be dedicated to that one task—ie. in this example to holes and particularly to only certain holes on that part or family of parts and nothing else. Therefore, what might be a very complex general purpose processor has here been reduced in scope to something extremely dedicated just to holes and just to a class of holes say. This is a great simplification.

FIG. 20 illustrates the segmentation of a matrix array image plane into a 8×6 matrix of segments. Naturally, given the fact that many of these matrix arrays can have as many as 400×300 elements today, this naturally could be a segment just as easily of 30×25 or any other such or even 100×80—whatever convenient segmentation is desired for the part in question.

The image of the rocker cover rail 1200 viewed from the top at approximately a nominal range is shown with a segmented image. At this point one can immediately, when one sees that the left edge 1210 of the part is in the column 2 on the left hand side, one immediately knows from the part dimensions that the right edge of the part has to lie in column 5 or 6 on the right. One immediately then can process down the columns the rows let's say in column 2 until one finds the corner of the part as in row 3 column 2. In that location, one knows exactly that a hole must be near. One also can immediately find the other holes from that segment and their segment locations and immediately go to the processing of the holes ignoring all other data therefore that lies in columns 1, 3 and 4 as well as rows 1, 2 and 6. Obviously, this cuts down the number of pixels that have to be processed to obtain this data.

It is considered that if the cylinder head is not moving relative to the robot during the time that the target determination process is taking place, one can therefore immediately lock on the robot and literally keep the head in this general area of the image throughout the total hole tracking process as the robot closes in on the head for whatever purpose. The head either moving or stationary. This way one never needs to process more than a few segments of data since one can actually dynamically, once the part is found, re-segment the part image so that the target windows lock on around the holes only and thereby ignore all the rest of the data in the image.

The windowing of the targets has been described somewhat in the Pinckney invention. Again, however, in this case the targets circuits of Pinckney actually cannot be used since the target images are too indistinct for simple thresholding to occur.

This brings up another point namely on moving parts, the FEP front end processor has to actually take data back from the tracking processor to tell itself where to look with the tracking processor then moving in conjunction with the front end processor to lock on the part. In this respect, one has to say almost that the two are similar. Either that or the tracking processor has to have an ability to have some of the same fineness in seeing holes in a poor contrast background that the front end processor has.

Another point that has to be noted is that the robot can approach the target from a very oblique angle in which case hole images could be less than ideal. In this case, the front end processor has to be able to locate the holes even in the presence of considerable variences in lighting. However, the human is able to do this and it is considered likely that with suitable sophistication one can do this as well, automatically.

A very interesting point however—the human does not see the position of objects from the hole or target locations. The human eye with its stereo vision locks on features of the object in someway not totally known but it certainly doesn't lock on a particular set of holes and use them forever as the target locations. The invention is then operating in a way quite different from the human eye but nonetheless effectively and in a sense similarly. However, for accuracy, the invention assumes an a priori knowledge of the hole or target spacings on the part—the human doesn't.

It goes without saying that multiple cameras can be used to look at a set of holes from two different angles to get a more stereo resolution. This can yield increased sensitivity to pitch and yaw as seen from the single camera as well as improved depth dimension as well, although this is perhaps not as necessary.

Coincidence type techniques could be used too. If both cameras 1300 and 1301 identified a hole or other feature at the correct location in their respective but angularly displaced fields of view θ, then the hole could be considered a true reading (FIGS. 21A and 21B). This is different than two camera stereo in that we are not solving for range persé, but using an approximate knowledge of range to establish a probability that the images are from the same desired feature.

Feature signatures useable with the invention (besides shape or size—e.g. hole diameter) include the modulated return in reflected light from threaded holes, (see for example my patent "Threads and Holes"). For holes on machined surfaces or light/dark/light, typical signature exists with the dark zone being related to the hole diameter.

Other signatures include the radial scattering of light off of radiused surfaces such as rolled off edges of certain types of metal. The corners of such metal panels always have a radius which can be searched for too. On an assembly, one can think too of the point where sheet metal panels meet, as a target as in where the trunk, quarter panel and rear part of the body meet. It's actually defined by a 3 point line intersection in many cars. Other intersections would simply be the two line intersection of any corner of any panel of a car. Other parts fit this as well.

Writing can also be used as a target. A front end processor is shown in figure relative to lettering on car batteries where it could lock in on certain letters which were to be used as targets. This would apply to a large number of things. Tires, dash lettering, lettering on underhood wiring etc. Additional "letters" such as crosses, dots, etc. could easily be put on many of such items as well, if desired.

As shown in FIG. 22A a gantry robot 1500 carrying a camera 1501 and tooling 1502 is picking up batteries 1510 and installing them in moving (or stationary) cars 1515 using target points on the battery such as the writing thereon and and/or the filler CAPS (see FIG. 22B) and the 3 screw holes (or contrasting screwheads) 1520, 1521 and 1522 in battery box bottom 1525 (see FIG. 22C).

In this case, the FEP locks in on both certain letters on the battery and to guide the robot to pick it up and the holes (or screw heads) in the case to guide it when placing the battery in the car. Typically 3, or better, 4 points are needed to establish a plane.

The example of screws, chrome against a dark background is interesting since one could purposely use fasteners and other hardware that provided such contrast.

This would be particularly easy in areas where aesthetic considerations did not apply (under a hood say) but these could actually add to the appearance in some cases. Block sheet metal screws against sheet metal is another, the heads of which can generally be painted over anyway.

One can also project targets and use triangulation (e.g. see U.S. Pat. No. 4,373,804 "Turbine"). This can be in addition to target data or the part.

For example, suppose two target points gave x,y and z location, but were ambiguous on z and angle because of pitch/yaw considerations. In this case, one can project dots or other zones and observe their image on the part surface. From this an additional knowledge of range and/or attitude can be obtained which with the target data, allows accurate solutions for object location.

It is further noted that the object feature, be it holes, corners or whatever, should in general be a two dimensional object feature, i.e. have a length and width—i.e. an extension in 2 axes. If the minimum number of 3 target points are to be used to get a 6 degree of freedom solution, then each must be a two axis target. With more targets, some could be one axis (e.g. a long edge).

It is noted that the invention generally uses a single camera to obtain in one view, 3 or 4 target images on an object. However, multiple views can be taken or multiple cameras used and the target locations combined.

It is also possible to use orientation codes as targets to help determine where the other targets or chosen features are. For example, to avoid the vision system having to search all through space, one could simply put one target onto a part, for example, a stick on "dot" that could be stuck on in a station (e.g. a machining operation) where the rest of the orientation of the part was known. This dot could however carry an orientation code in it, for example, in essence pointing (dotted lines) at where the other features on the object were that should be used as targets.

Figure 23A:
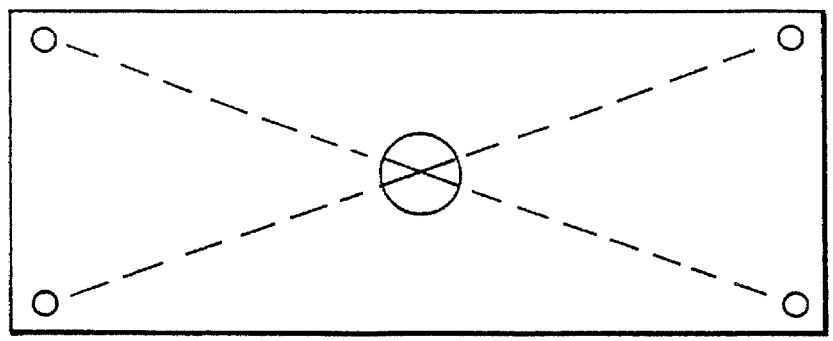
FIGS. 23A and 23B illustrate the use of a target location identified target on a part.
Figure 23B:
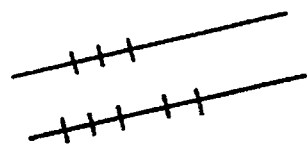

FIG. 23A illustrates the situation on a cylinder head. The target could actually include a "pointer" as in a line at an angle, or it could be some sort of code scheme with bar (see FIG. 23B) or concentric lines, grids, even numerals, if readable, that would tell where on the part the points of reference were. It could also identify the part. (Data as to target location would be called from a data base for that part).

If the identifier target was in the middle of the part, as on the head shown, it could say in effect this is a 4 cylinder cylinder head and it had simply the xy references on it as for example a crossed reticle, then we could easily go immediately via the crossed reticle to the points on that plane of the cylinder head that had the holes. This is a very interesting point since it reduces the number of targets and allows one to more easily use the natural targets while also serving as a part identifier. Some of this part identification thing may have been talked about in the previous turbine case too.

Figure 24:
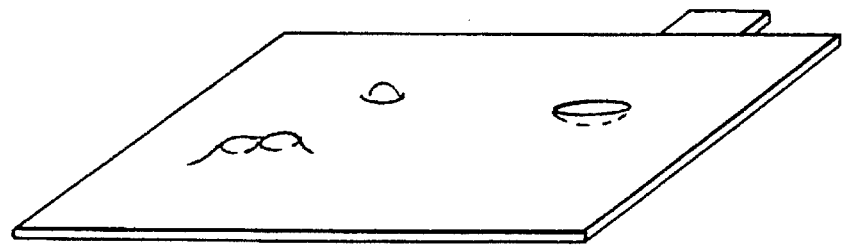
FIG. 24 illustrates use of the FEP to obtain a cast in target

Another FEP application is to identify cast-in targets in metal castings or molded in targets, bumps, or depressions on sheet metal or plastic (FIG. 24). Here contrast is often very poor so the more unusual the target molded in (e.g. reticle) the better chance for a good signature.

It should be recognized that once one builds a hole type FEP processor and if one is to use it on things that don't have holes, then one could make artificial holes either by purposely putting them in or by painting them on. In other words, what one could have was a general purpose machine that could be used with anything that is a hole type of situation, it's just that you've overkilled the front end processor for a very distinct hole type target.

Commercially however, the idea of one single general purpose FEP, designed for the largest naturally occuring target case ie. holes, is appealing. It could be integrated on a VLSI chip with other components such as the matrix array etc. If one didn't have a hole, a simple dot target painted on, glued on would or could, with tuning, give an equivalent indication.

It is noted that additional holes or other features over and above the three needed to establish an object plane for guidance can be programmed into the front end processor to allow for backup in case any are unreadable.

The camera unit should be approximately positioned for best focus of the object image, and the automation can be served to accomplish this (or the lens moved to correspond to a given range data). However, even where moderately defocused, the FEP may be able to deduce the target feature locations at least sufficiently to provide image information to allow further movement to bring the object into better focus. Large depth of field is desirable to minimize such problems.

Suitable tracking processors exist generally in the missile and space tracking art and to a degree are disclosed in Pinckney et al. In his invention he places 'windows' around the target images and produces signals which, though not disclosed, could allow, if required, a machine containing a camera to track the part physically so as to keep the targets in view.

The tracking function here is similar except that the signatures of the part feature can be much more complex, and potentially varient within the field of view of the camera. For this reason, a degree of intelligence is required in the tracking processor to discern the target. Thus a portion of the standard image processing functions inherent in processors such as the Hitachi or Analog Devices ones mentioned earlier could be required. It is thought that very limited capability would be required in most instances, the main image processing job of acquiring the targets being accomplished by the FEP.

I claim:

1. A method of assembling a first object to a second object comprising the steps of:

providing a robot arm with a plurality of sensors mounted thereon;

associating the first object with the robot arm for manipulation thereby;

electro-optically sensing the location of a plurality of known references points on one of the first and second objects using a respective one of the plurality of sensors for each reference point;

determining the location of the robot arm relative to the one of the objects using the sensed locations of the reference points;

moving the robot arm to precisely position the first object relative to the second object; and assembling the first object to the second object while the first object is precisely positioned relative to the second object by the robot arm.

2. A method of assembling as claimed in claim 1 wherein said sensing step includes the steps of electro-optically sensing the location of a plurality of known references points on the first object using a respective sensor for each reference point which sensors are mounted on a robot arm and determining the location of the first object relative to the robot arm using the sensed locations of the reference points.

3. A method of assembling as claimed in claim 2 wherein said sensing step further includes, after sensing of the location of the first object, the steps of initially moving the first object with the robot arm adjacent the second object and then electrooptically sensing the position of a plurality of known references points of the second object relative to the robot arm using the respective sensors on the robot arm.

4. A method of assembling as claimed in claim 2 and further comprising the step of initially attaching the first object to the robot arm before the sensing and the determining step.

5. A method of assembling as claimed in claim 2 and further comprising the step of attaching the first object to the robot arm after the sensing and the determining step.

6. A method of assembling as claimed in claim 2 wherein the sensing step includes the sensing of designated targets on the first object selected from specially applied targets, natural features of the object and holes in the object.

7. A method of assembling as claimed in claim 1 wherein said sensing step includes the steps of initially moving the first object with the robot arm adjacent the second object and then electro-optically sensing the position of a plurality of known references points of the second object relative to the robot arm using the respective sensors on the robot arm.

8. A method of assembling as claimed in claim 1 wherein the sensing step includes the sensing of designated targets on one of the first and second objects selected from specially applied targets, natural features of the objects and holes in the objects.

9. A method of assembling as claimed in claim 1 wherein said moving step includes the steps of: illuminating a portion of the second object with light, detecting the light reflected from the portion with one of the sensors mounted on the robot arm, and determining a distance of the first object from the second object by triangulation using the detected light.

* * * * *